United States Patent [19]
Shikida et al.

[11] Patent Number: 5,380,396
[45] Date of Patent: Jan. 10, 1995

[54] VALVE AND SEMICONDUCTOR FABRICATING EQUIPMENT USING THE SAME

[75] Inventors: Mitsuhiro Shikida, Kokubunji; Kazuo Sato, Tokyo; Yoshio Kawamura, Kokubunji; Shinji Tanaka, Ibaraki; Yasuaki Horiuchi, Yono; Akira Koide, Chiyoda; Toshimitsu Miyada, Hachioji, all of Japan

[73] Assignee: Hitachi, Ltd., Tokyo, Japan

[21] Appl. No.: 138,051

[22] Filed: Oct. 19, 1993

Related U.S. Application Data

[62] Division of Ser. No. 890,711, May 29, 1992, Pat. No. 5,284,179.

[30] Foreign Application Priority Data

May 30, 1991 [JP] Japan ................... 3-127705
Sep. 30, 1991 [JP] Japan ................... 3-250721

[51] Int. Cl.6 .................... B44C 1/22; C23F 1/00; C23C 16/00
[52] U.S. Cl. .................... 156/630; 118/728; 156/634; 156/644; 156/656; 156/657
[58] Field of Search ............ 156/630, 634, 643, 644, 156/647, 655, 656, 657, 662; 137/825, 831, 833, 837, 838; 118/715, 728, 50, 50.1

[56] References Cited

U.S. PATENT DOCUMENTS

| | | |
|---|---|---|
| 2,901,623 | 8/1959 | Wouters . |
| 3,981,480 | 9/1976 | Eevnisse . |
| 4,474,212 | 10/1984 | Schmitz . |
| 4,530,317 | 7/1985 | Schutten . |
| 4,581,624 | 4/1986 | O'Connor ............ 156/644 X |
| 4,610,426 | 9/1986 | Brandner . |
| 4,617,952 | 10/1986 | Fujiwara et al. . |
| 4,647,013 | 3/1987 | Giachino et al. . |
| 4,756,508 | 7/1988 | Giachino et al. . |
| 4,934,401 | 6/1990 | Ikehata et al. . |
| 5,029,805 | 7/1991 | Albarda et al. . |
| 5,069,419 | 12/1991 | Jerman . |
| 5,082,242 | 1/1992 | Bonne et al. . |
| 5,244,537 | 9/1993 | Ohnstein ............ 156/662 X |

FOREIGN PATENT DOCUMENTS 298612 5/1954 Switzerland .

Primary Examiner—William Powell
Attorney, Agent, or Firm—Antonelli, Terry, Stout & Kraus

[57] ABSTRACT

Disclosed is a gas valve capable of switching gases to be introduced within a vacuum chamber with high speed thereby enhancing the controllability of the composition of a semiconducting thin film growing on a substrate and shortening the time required for growth of the thin film. The gas valve comprises a bendable film between a pair of parallel plate electrodes whereby operating the film by an electrostatic force and opening and closing a port for releasing gas to a substrate mounted on the wall surface of a gas chamber and a port for exhausting an unnecessary gas to an exhaust passage. The gas valve is mounted in the vicinity of the substrate within the vacuum chamber for supplying a working gas in a minimum amount required for the film growth.

19 Claims, 17 Drawing Sheets

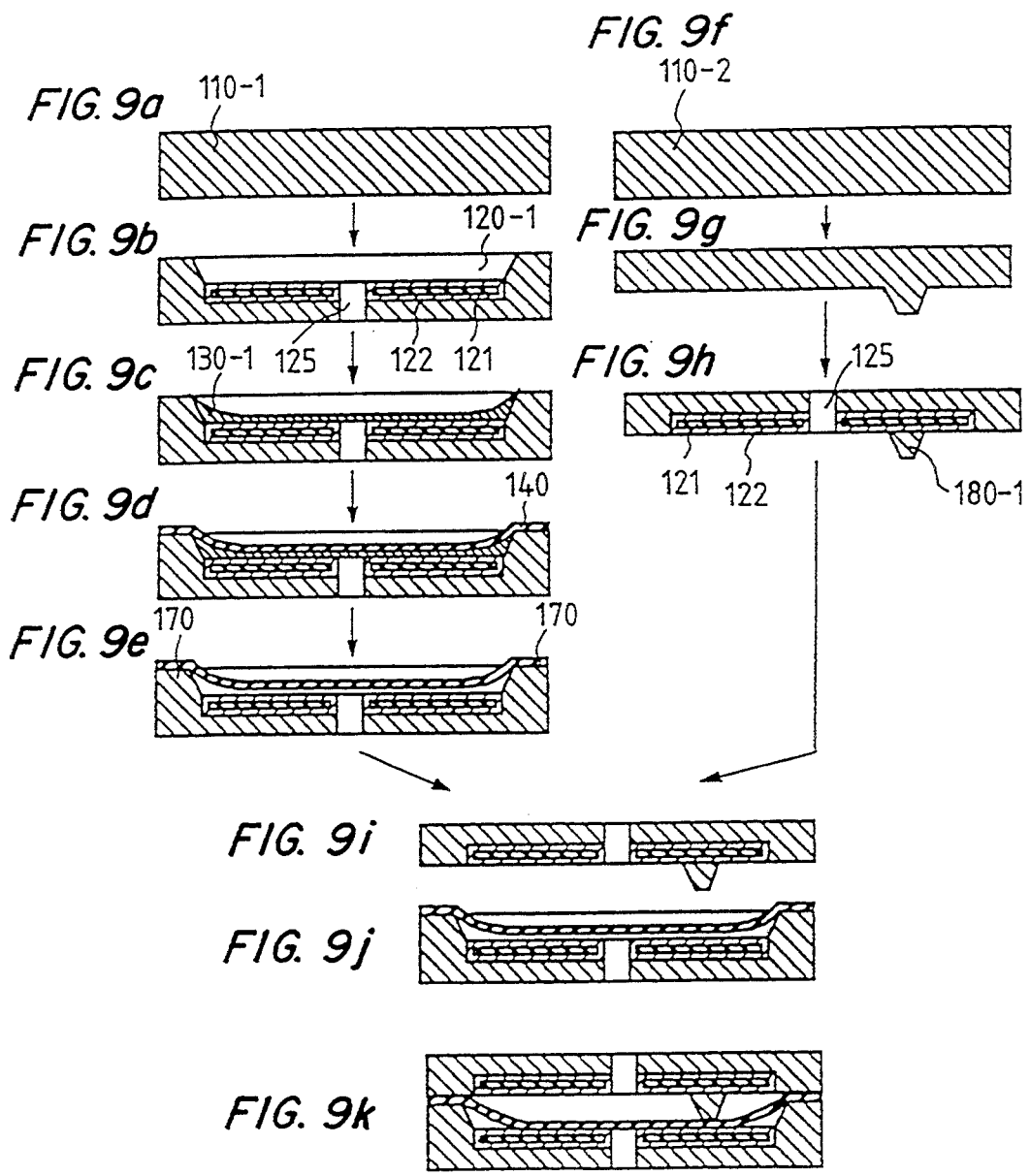

FIG. 10a
FIG. 10i
FIG. 10b
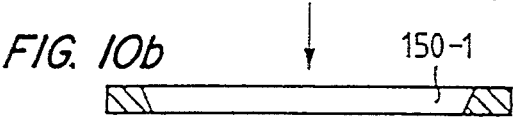
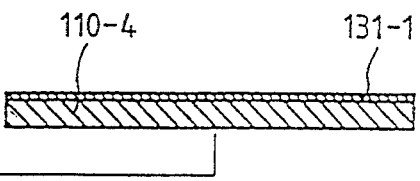
FIG. 10c
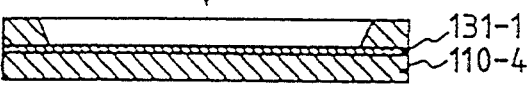
FIG. 10d
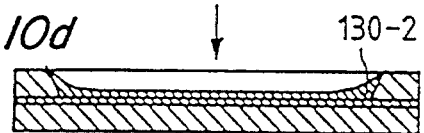
FIG. 10e
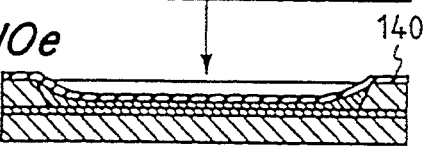
FIG. 10f
FIG. 10j
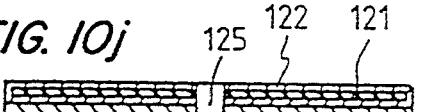
FIG. 10g
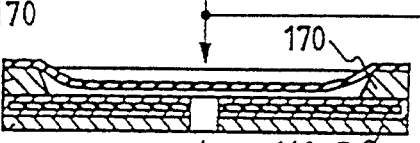
FIG. 10k
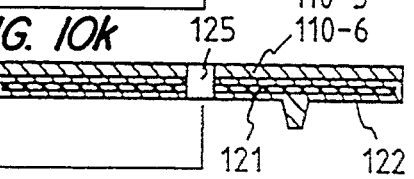
FIG. 10h
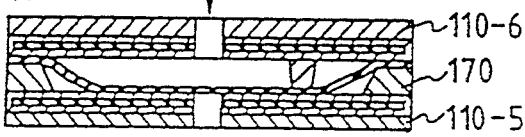

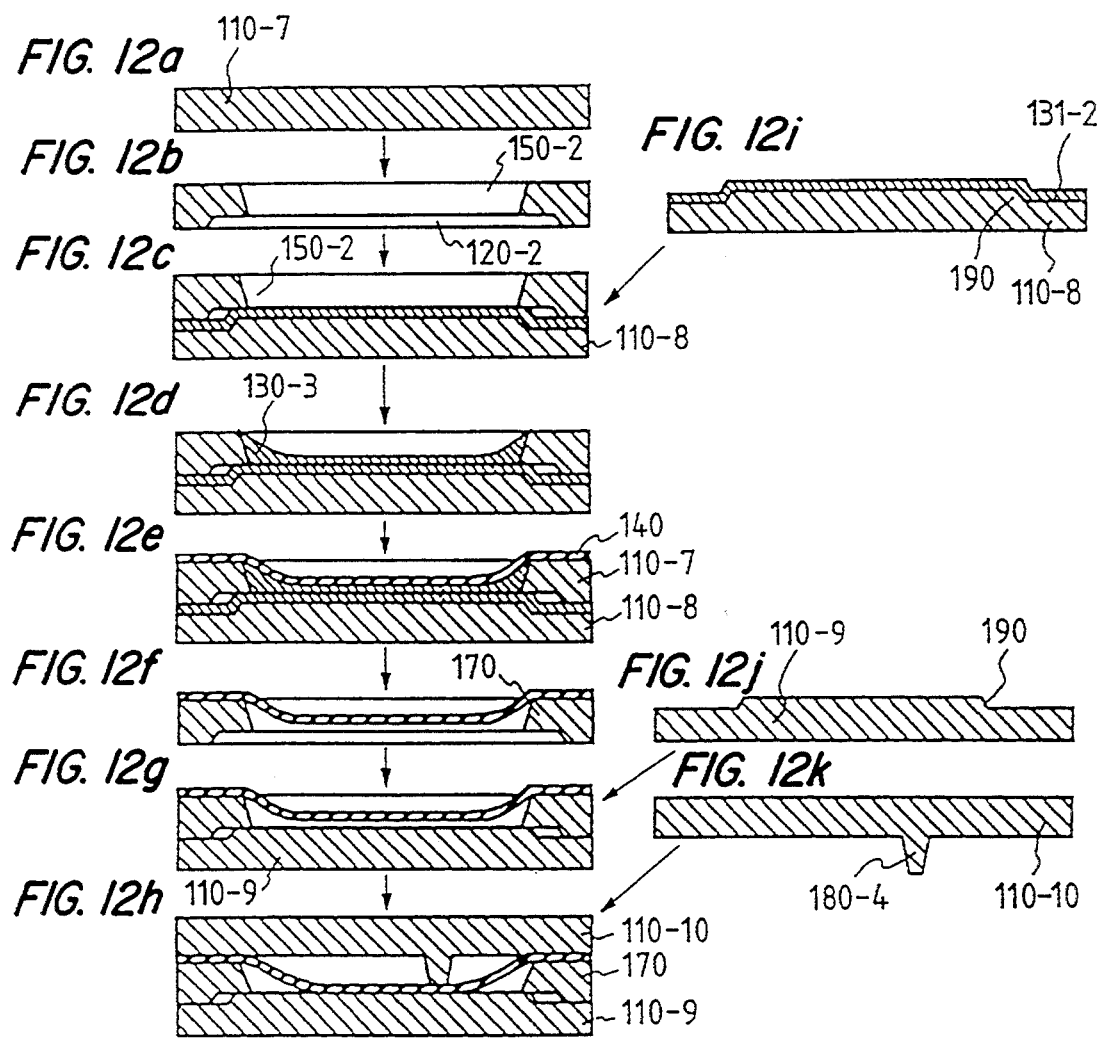

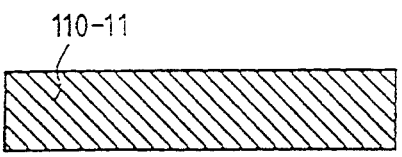
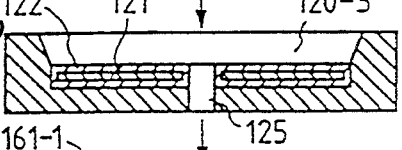
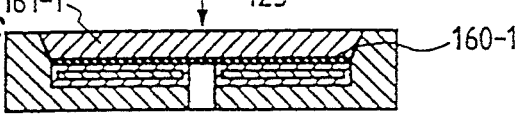
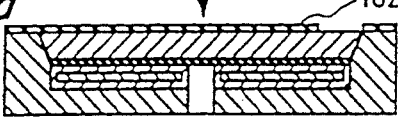
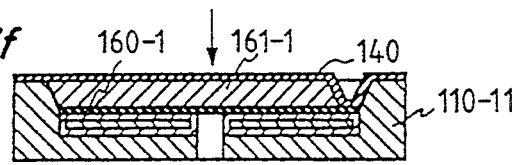
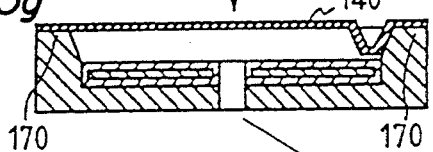
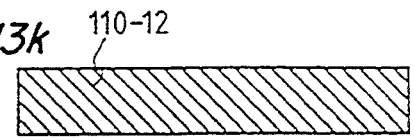
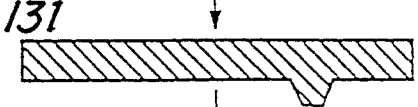
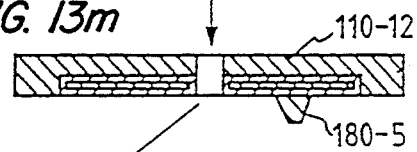
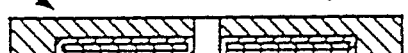
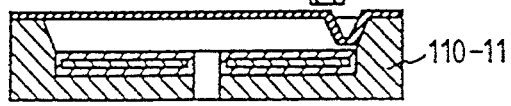
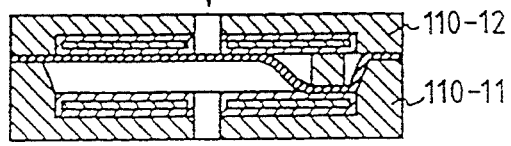

VALVE AND SEMICONDUCTOR FABRICATING EQUIPMENT USING THE SAME

This is a division of application Ser. No. 07/890,711, filed May 29, 1992, now U.S. Pat. No. 5,284,179.

BACKGROUND OF THE INVENTION (1) Field of the Invention

The present invention relates to a valve and a semiconductor fabricating equipment using the same, and particularly, to an actuator for opening and closing action in a valve adapted to control a flow rate of fluid, and a semiconductor fabricating equipment for forming a semiconducting film on the surface of a substrate by switching different kinds of source gases using the above valve.

(2) Description of the Prior Art

There has been disclosed an actuator for a valve or the like used to control a flow rate of a trace of fluid, in Proceedings of the IEEE Micro ElectroMechanical System, pp 95-98, 1990, wherein the actuator comprises a sheet having one end being fixed to serve as a valve body and an electrode which has a passage port and is disposed on the lower side of the sheet surface whereby the sheet is displaced by an electrostatic force for opening and closing the passage port.

Specifically, the above actuator is constituted of a dielectric with a passage port including a plate electrode on a silicon substrate, and a valve body made of a dielectric including a plate electrode for opening and closing the passage port, wherein the sheet is attracted to the electrode surface by an electrostatic force generated between the electrodes, to thereby close the passage port provided on a part of structure on the electrode side. Meanwhile, the opening of the passage is effected by utilizing a restoring force of the sheet functioning as a spring. In the above actuator, it takes comparatively long time to open and close the passage port. Particularly, the time required for opening the passage port is restricted by the quickness of the returning of the sheet due to the restoring force thereof and is hence difficult to be made shortened. Also, the electrostatic force acted in closing the passage port must be too large to resist the restoring force of the sheet functioning as a spring. The electrostatic force is inversely proportional to the square of the distance between the electrodes. Accordingly, in order to obtain a sufficient electrostatic force to resist the above restoring force, the above-mentioned conventional structure needs to makes smaller the distance between the sheet and the electrode located under the sheet up to a gap, for example, of several ten μm. Therefore, since a flow rate of fluid is restricted by the distance between the sheet and the electrode under the sheet, a valve using the conventional actuator has a difficulty to control a large flow rate of fluid.

The technique of forming a semiconducting film on a semiconductor substrate is an important process in the fabrication of semiconductor devices such as IC, and LSI. In general, the epitaxial growth process requires switching of plural kinds of gases. As shown in FIG. 23, the switching of gases in a semiconductor fabrication has been carried out with use of a valve 50 provided in a tube 51 connected with a gas bomb disposed separatedly from a vacuum chamber 49 internally including a substrate 48 (disclosed, for example, in Japanese Patent Laid-Open No. sho 63-136616).

In the above-mentioned Japanese Patent Laid-Open No. sho 63-136616, there has been proposed a system comprising an opening and closing equipment provided between an epitaxial growth chamber and a gas introducing vessel whereby gas is exhausted from the gas introducing vessel in closing the opening and closing equipment.

Recently, with micronizing semiconductor devices, the epitaxial growth technique is required to form an extremely thinned film, for example, a superstructure having a layer thickness of at least 1 nm with accuracy of atomic order. As shown in FIG. 23, the prior art includes a long pipe from a valve 50 to a vacuum chamber 49, which occurs a delay time between valve switching and gas-flow switching in the vacuum chamber, and which makes the change in gas pressure slow. Accordingly, for the purpose of forming a superstructure on a substrate by alternately introducing different kinds of gases within the vacuum chamber, the prior art has disadvantage of not sufficiently controlling the atomic arrangement of the superstructure and of taking a long period of time for film growth.

Furthermore, the above-mentioned prior art has a large disadvantage accompanied by supplying gas from the gas introducing vessel. For example, it has a difficulty to supply a reaction gas in a minimum amount required for epitaxial growth only in the vicinity of the surface of the substrate. This is due to the fact that there has been merely known such an opening and closing equipment as being in a grade of a shutter used in a Molecular Beam Epitaxy (MBE). Even in the above-mentioned Japanese Patent Laid-Open No. sho 63-136616, there has been not disclosed the more concrete form of the opening and closing equipment.

Meanwhile, for making the semiconductor fabrication speedy, there has been proposed a technique of disposing a nozzle in the vicinity of a substrate to be processed, and of mechanically controlling the port of the nozzle for opening and closing action. However, the technique is disadvantageous in that the mechanical opening and closing action tends to yield pulsating current of fluid, that is, turbulent flow in a gas passage, which is unsatisfactory for the fabrication of the above mentioned micro-superstructure or the like.

SUMMARY OF THE INVENTION

It is therefore the primary object of the present invention to realize a semiconductor fabricating equipment capable of accurately forming different kinds of semiconducting layers without requiring a long time for growth thereof.

It is another object of the present invention to realize a valve capable of switching gases of a large flow rate with high speed and high accuracy, and hence being adapted for the above-mentioned semiconductor fabricating equipment.

To achieve the above objects, the present invention provides an actuator required for a valve capable of switching fluids with high speed and high accuracy and hence being adapted for a semiconductor fabricating equipment. The actuator comprises: film supporting means for supporting both ends of a bendable film; a film functioning as a valve body, which has the development length longer than a distance between film supporting members of the film supporting means and has at least one inflexion point when being supported by the film supporting means; and operating means for moving the inflexion point. Namely, the valve is formed by a vessel in which fluid is introduced, ribbon-like film having at least one inflexion plane movable within said vessel, a plurality of ports provided on the wall of the vessel, and film operating means for opening and closing a plurality of said ports by movement of the inflexion plane of the film.

In a preferred mode, the valve includes a conductive film as the above film and electrodes as the film operating means disposed at both positions facing to upper and lower sides of the film surface, wherein a voltage is applied from or to across the conductive film and the upper side electrode and to or from across the conductive film and the lower side electrode, thus crosswisely moving the inflexion point of the film with an electrostatic force. Furthermore, the preferred mode includes at least one passage port formed on the part of the insulating layer and electrodes. In this case, by moving the inflexion point of the conductive film, the surface of the conductive film serves as a valve body for opening and closing the passage port, to thereby form a valve for controlling a flow rate of fluid.

The above mode may involves such a modification that the film and the operating means are composed of a magnetic material and an electromagnet, respectively.

The valve of the present invention functions to move the inflexion point of the film by the electrostatic force (or electromagnetic force) sequentially from the position where the film and electrode (or electromagnet) are in close proximity to each other. Consequently, even when the supporting means is long in height, that is, a distance between the upper and lower electrodes (or electromagnets) are enlarged, the film can be operated. Therefore, there can be suitably set the distance between the electrodes (or electromagnets) disposed on the upper and lower sides of the film to hence enlarge an interval between the passage port and the valve body, thus controlling a large flow rate of fluid. Furthermore, since the opening and closing action in valve is irrespective of the restoring force of the film, it is possible to open and close the passage port of the valve with high speed by the electrostatic force (or electromagnetic force).

The valve of the present invention comprises electrodes, an insulating layer and a metallic film and hence can be fabricated to the size of 10 mm or less using semiconductor micro-processing technique. Also, a plurality of valves can be integrated in a unit structure. Furthermore, respective gas outlets of a plurality of the valves are set in a matrix-like arrangement in a unit structure, which makes it possible to independently operate respective valves with electric signals.

Hereinafter, there will be described a process for fabricating a micro-valve using semiconductor micro-processing technique.

In order to obtain the micro-valve with a size of 10 mm or less, there is adopted such processes as involving a photolithography technique, a patterning technique for a thin film and a substrate, an etching technique, and a technique using sacrifice layer selectively etched with solution.

A channel with a depth of several 10 to 100 $\mu$m is formed on a silicon substrate by anisotropic etching, and an electrode pattern, insulating layer and fluid port are formed in the channel. Subsequently, a sacrifice layer is also formed in the channel, and a film serving as a valve body is formed on the sacrifice layer in such a manner as to be supported at both the ends by the silicon substrate other than the channel.

After formation of the film, the sacrifice layer under the film is selectively etched by solution. Consequently, the film is supported by the silicon substrate at only both the ends thereof, thus forming a film structure having an inflexion portion in the channel of the substrate. Subsequently, the thus film structure having the electrode pattern, insulating layer and fluid port is bonded with another substrate having an electrode pattern, insulating layer and fluid port, to thereby fabricate a micro-valve.

The above-mentioned process is characterized by fabricating the micro-valve with use of two substrates.

Meanwhile, a silicon substrate formed with a hole by anisotropic etching or electric discharge machinning is assembled to a silicon substrate formed with a first sacrifice layer on the surface, thus obtaining a structure similar to the above-mentioned channel. A second sacrifice layer and a film are formed on the assembled substrates, thereby forming a film structure which is supported by the substrate at both the ends to thus form an inflexion portion, similarly to the above manner.

The film structure thus fabricated may bonded with two substrates each having a fluid port and an insulating layer on an electrode pattern, to thus form a micro-valve.

Furthermore, the present invention provides a semiconductor fabricating equipment wherein a sample substrate is mounted in a vacuum chamber and gas is supplied within the vacuum chamber by gas supplying means thus forming semiconducting layers on the surface of the substrate. In this case, the above gas supplying means includes: a first passage for introducing gas in the vacuum chamber; a valve of the present invention provided on the extreme end of the passage; a second passage for introducing exhaust gas outside the vacuum chamber. Also, the above gas valve includes; a port through which necessary gas is supplied to the substrate out of the gas supplied through the first passage; a port through which exhaust gas is released in the second passage; and gas controlling means for controlling a ratio of necessary gas to exhaust gas.

In another preferred mode, the above sample substrate and the valve are disposed within a vacuum chamber with an exhaust port. In this case, the valve is miniaturized, and the gas port and housing thereof is made of a material with a chemical stability to withstand the baking temperature within the vacuum chamber.

In a further preferred mode, there is formed a plurality of ports for supplying gas to the sample substrate on the valve, thus making the gas distribution in the vicinity of the surface of the substrate uniform. Also, there may be provided doubled vacuum chambers, wherein a port of the valve for supplying gas to the substrate is positioned on the wall of the inner vacuum chamber.

In a still further preferred mode, there is provided a valve mounting chamber for introducing the valve next to a semiconducting layer growth chamber. In the valve mounting chamber, a micro-valve mounted at an extreme end of a pipe is baked under a vacuum similar to that of the growth chamber, and is then introduced into the thin film growth chamber. In order to uniformly form the thin film on the substrate, respective positions of the substrate and micro-valve can be suitably set.

The semiconductor fabricating equipment of the present invention is so constituted that a valve is disposed in the vicinity of a sample stage to control the gas flow rate in the vicinity of the sample stage without any pipe. As a result, epitaxial growth can be effected with such a high speed as being comparable to that obtained by being injected through a nozzle. Furthermore, the valve is operated to distribute the gas supplied at a specified flow rate into a necessary gas for growth of semiconducting layers and an exhaust gas. Accordingly, there occurs no pulsating current of gas thereby stabilizing the gas supply, which enhances the accuracies of thickness of semiconducting layers and material composition. Particularly, in disposing a plurality of ports of the gas valve on the same plane facing to the sample stage, gas distribution in the vicinity of the sample stage is made uniform, resulting in the obtained semiconducting layers with high accuracy. Preferably, the valve has a bendable film which is fixed in a bent form between a pair of parallel plate electrodes through an insulating layer. And, by applying a voltage across the film and the electrode, the film is attracted and moved to the electrode by the electrostatic force thereby opening and closing the port of a valve having an actuator formed on a part of the electrode. The thus valve is small in the outer shape, has no friction of motion, and can be composed of heat resisting material being less liable to release gas from the surface, differently from an electromagnetic valve, air valve or the like. Accordingly, the valve can be directly mounted and operated within the vacuum chamber. As a result, since the valve can be located closely to the substrate within the vacuum chamber, reaction gas can be supplied to the necessary minimum space. This remarkably improves the controllability of gas pressure in the vicinity of the surface of the sample substrate, which makes it possible to accurately control the atomic arrangement of a growing superstructure, and also to shorten the time required for the film growth.

Furthermore, in an integrated micro-valve wherein a plurality of micro-valves are set in a matrix-like arrangement on one substrate, each micro-valve can be independently opened and closed with electric signals. This provides such additional functions as selecting a gas to be introduced within a thin film growth chamber from several kinds of gases, and as introducing the selected gas to the thin film growth chamber from only a specified one among a plurality of outlets. Thus, a specified film can be formed on a specified region on the substrate.

BRIEF DESCRIPTION OF THE DRAWINGS

These and other objects and advantages and further description will now be discussed in connection with the drawings in which:

FIGS. 9a to 9k are process diagrams showing an example of a micro-valve fabricating method according to the present invention;

FIGS. 10a to 10k are process diagrams of another example of a micro-valve fabricating method according to the present invention;

FIGS. 12a to 12k are process diagrams of a still further example of a micro-valve fabricating method according to the present invention;

FIGS. 13a to 13m are process diagrams of an additional example of a micro-valve fabricating method according to the present invention;

FIGS. 14a to 14m are process diagrams of an example of combining the examples as shown in FIGS. 10 to 10k and FIGS. 13a to 13m to each other;

DESCRIPTION OF THE PREFERRED EMBODIMENT

Hereinafter, the exemplary embodiments of the present invention will be more detail described with reference to the accompanying drawings.

EXAMPLE 1

Figure 1:
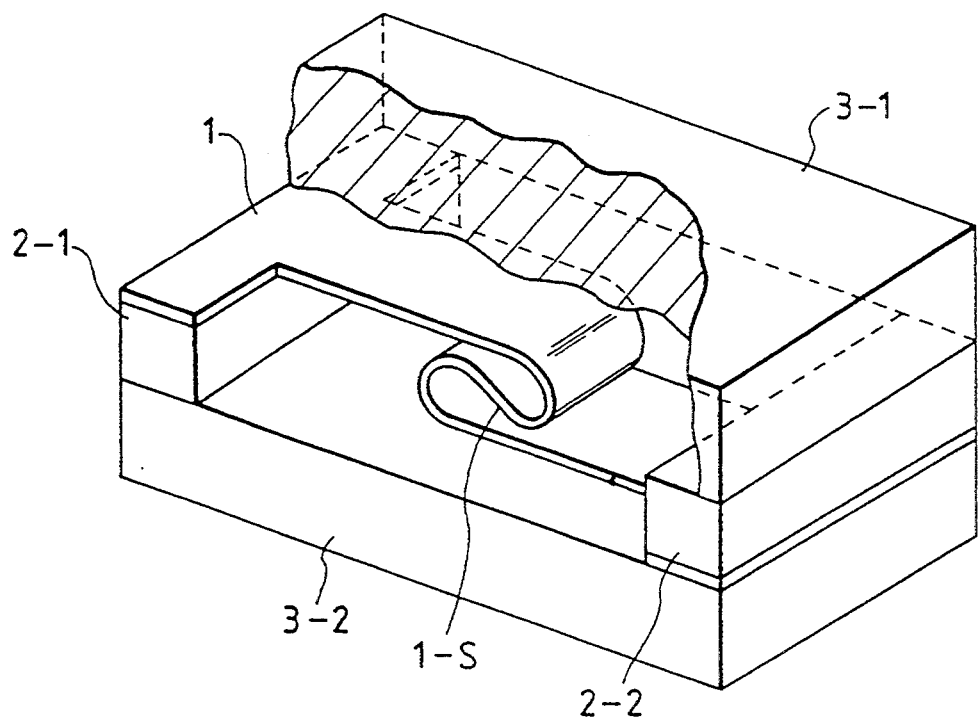
FIG. 1 is a perspective view including a partial cross section showing an example of an actuator constituting a valve primary part according to the present invention.
Figure 2:
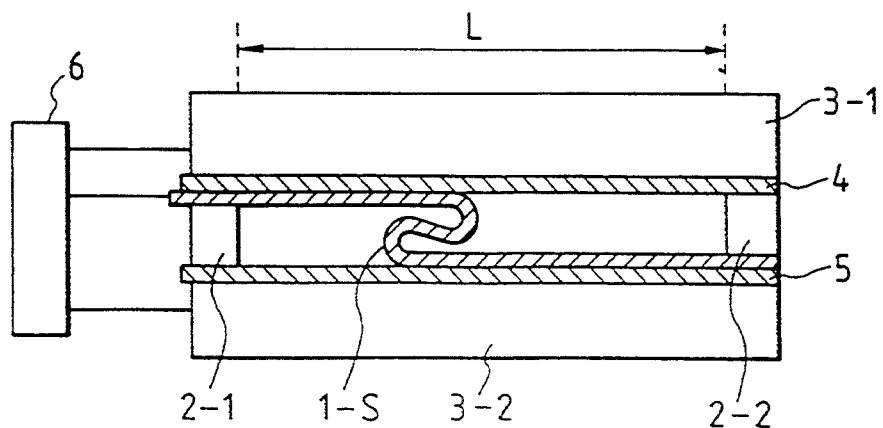
FIG. 2 is a cross sectional view showing an example of an actuator constituting a valve primary part according to the present invention.

FIGS. 1 and 2 is a perspective view including a partial cross section and a side cross sectional view showing an example of an actuator constituting a primary part of a valve according to the present invention, respectively.

In this example, the actuator includes a ribbon-like conductive film 1, two film supporting structures 2-1 and 2-2 for supporting both the ends of the film, and upper and lower operating units 3-1 and 3-2 respectively supported by the supporting structures 2-1 and 2-2 for operating the film 1. The film 1 is supported in such a manner as to form a S-shaped inflexion portion within tile film 1, and accordingly, the length of the film 1 is set to be longer than an interval between the film supporting structures 2-1 and 2-2 with a height of, for example, 3 mm.

The film 1 is operated by the operating units 3-1 and 3-2 in such a manner that the curved plane (inflexion portion) 1-S is moved. The operating units 3-1 and 3-2 are constituted such that the portions facing to the upper and lower surfaces of the film 1 are made to be flat, respectively. As a voltage is applied across the operating unit 3-1 and the film 1, the upper surface of the film 1 is brought in close-contact with the lower surface of the operating unit 3-1 sequentially from the supporting structure 2-1 to 2-2 side. At the same time, the lower surface of the film 1 being in contact with the upper surface of the lower operating unit 3-2 is separated from the operating unit 3-2 sequentially in the direction from the supporting structure 2-1 to 2-2 side, thus moving the curved plane 1-S to the supporting structure 2-2 side.

Specifically, the actuator includes the operating unit 3-1 having an electrode disposed on the upper side of the conductive film 1 through an insulating layer 4 of a thickness of 2 $\mu$m or less, and the operating unit 3-2 having an electrode disposed on the lower side of the conductive film through an insulating layer 5 of a thickness of 2 $\mu$m or less. By switching a voltage applied by a switching circuit 6 from or to across the electrode of the operating unit 3-1 and the conductive film 1 to or from across the electrode of the operating unit 3-2 and the conductive film 1, the S-shaped inflexion portion 1-S of the film 1 supported by the film supporting structures 2-1 and 2-2 is crosswisely moved by the electrostatic force. A translucent electrode made of ITO (Indium Tin Oxide) may be used as the electrode of the electrostatic actuator, which makes easy the observation of movement of the S-shaped plane caused by the applied voltage to thereby support the maintenance.

The height of the supporting structures 2-1 and 2-2 is determined based on the thickness of the film 1, curvature radius of the curved plane, loss resistance caused by fluid flow and the like. In general, with the thinned thickness of the film 1, the reduced elastic coefficient, and the increased curvature radius of the curved plane, the height of the film 1 can be reduced.

Furthermore, each of the insulating films 4 and 5 needs a thickness enough to resist against dielectric breakdown in applying a voltage across the conductive film 1 and the electrode for operating the film 1. The insulating layer 4 and 5 can be formed by using the conventional technique of evaporation or chemical reaction growth of an insulating material, holding of an insulating sheet, coating of insulating agent or the like. The insulating material may be coated not only on the electrodes of the operating units 3-1 and 3-2 but also on the surface of the film 1. Also, in order to effectively obtain the operating force due to the electrostatic force, there may be used an insulating material having a high dielectric constant so as to thin the thickness of the insulating layer without occurring dielectric breakdown.

As the material of the conductive film, there is used a film made of a composite material sticked with the above conductive material. In this case, the film comprises; a metallic film of aluminum, gold, platinum, chrome, iron, nickel, permalloy, or molybdenum; an alloy film made of a stainless steel or the like; and a film of polyimide resin, polyester, silicon, silicon nitride, silicon oxide, PBN (Pyrolytic Boron Nitride) or the like, on which surface the metallic or alloy film is formed.

EXAMPLE 2

Figure 3:
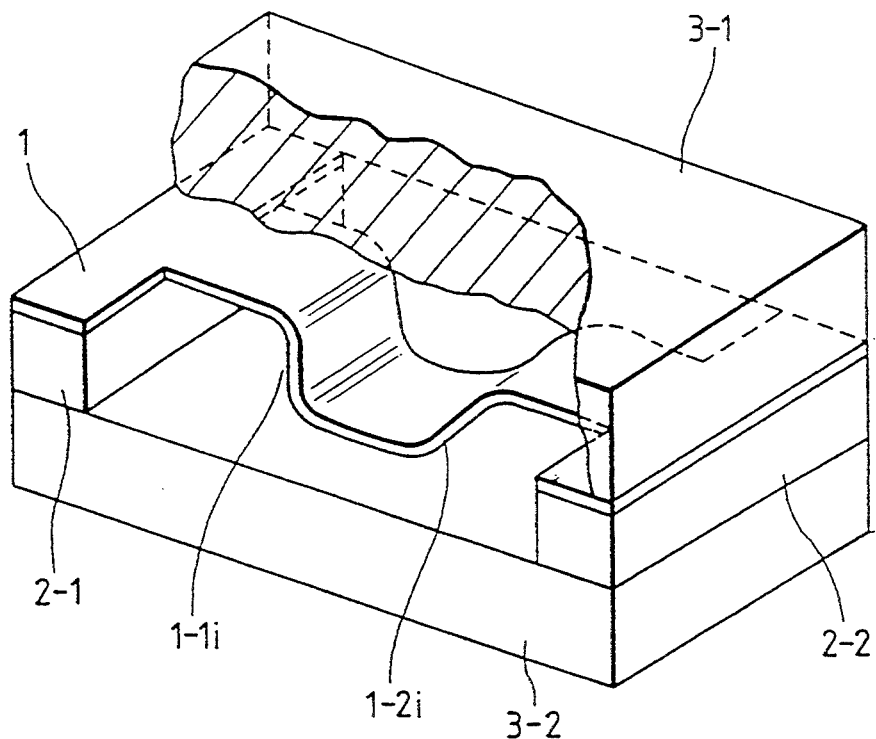
FIG. 3 is a perspective view including a partial cross section showing another example of an actuator constituting a valve primary part according to the present invention.

FIG. 3 is a perspective view including a partial cross section showing another example of an actuator constituting a primary part of a valve according to the present invention. In this example, the film 1 includes two inflexion planes 1-1$i$ and 1-2$i$ each having an integral-sign-shape of a smooth slope, and the other structure is the same as in FIG. 1. Each of the two inflexion planes 1-1$i$ and 1-2$i$ has a smooth and simple curvature radius compared with the S-shaped plane, and is easily fabricated. Also, the curvature radius is made larger, and the gap of two operating units in which the fill acts can be reduced. Therefore, the actuator of this example is adapted for miniaturization of the valve.

Meanwhile, the film 1 having the curved plane formed in a S-shape has an effect that, because the bend thereof is pushed between the surfaces of the operating units located on the upper and lower sides of the film, the film 1 is prevented from being deflected with its dead weight when not being attracted by the operating units. Accordingly, it has an advantage of enlarging the interval between two supporting structures twice in the case of the integral-sign-shape. For the applications, the shape of the curved plane of the film 1 is selected to be the integral -sign-shape or the S-shape.

EXAMPLE 3

Figure 4:
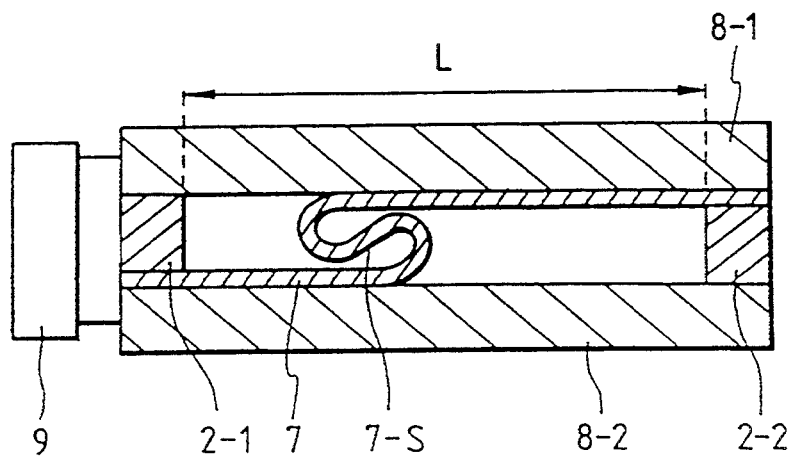
FIG. 4 is a cross sectional view showing a further example of an actuator constituting a valve primary part according to the present invention.

FIG. 4 is a cross section showing a further example of an actuator constituting a primary port of a valve according to the present invention. This example is characterized by operating the inflexion plane of the film by utilizing electromagnetic force as the film operating means.

The principle of the operation is the same as shown in FIG. 1. A film 7 is composed of a magnetic metallic film made of permalloy having a thickness of 5 $\mu$m. An operating unit includes electromagnets 8-1 and 8-2 respectively disposed on the upper and lower sides of the magnetic film 7. By switching the current flow from or to the electromagnet 8-1 to or from the electromagnet 8-2 with a switching circuit 9, a S-shape plane 7-1 of the magnetic film 7 is crosswisely moved by the electromagnetic force.

The magnetic film 7 is made of a magnetic film of iron, nickel, or an alloy thereof such as permalloy, or a composite material obtained by coating or evaporating the powder of the above metal or alloy or mixture thereof on the film of polyimide, polyester, silicon, silicon nitride, or silicon oxide. A superconductive material may be used as the magnetic material. Furthermore, an electromagnet or superconductive magnet may be used as the film operating unit to operate the film by applying current to a coil pattern formed on the upper and lower surfaces of the film.

The film 7 may be made of a shape memory alloy. The film made of the shape memory alloy previously storing the flat shape is plastically deformed into a S- shape in low temperatures, and both the ends thereof are rigidly supported to thus assemble an actuator, and thereafter, the film is heated at a martensite transformation temperature or more. With this method, the actuator can be assembled while deforming the film into a S-shape, to thereby make easy the fabrication process.

EXAMPLE 4

Figure 5:
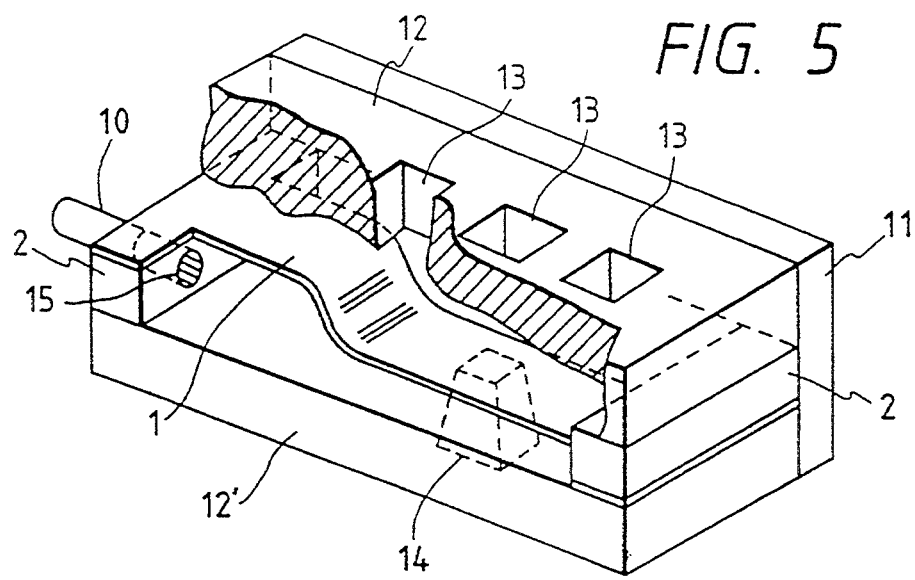
FIG. 5 is a perspective view including a partial cross section showing an example of a valve according to the present invention.

FIG. 5 is a perspective view including a partial cross section showing an example of a valve according to the present invention.

In FIG. 5, a valve includes a bendable metallic film 1 serving as a valve body, supporting structures 2 for supporting both the ends of the film 1, side walls 11 of the valve (the broken-out section shows the state of removing the side wall), and a pair of upper and lower plate electrodes 12 and 12' respectively each having an insulating film on the-surface facing to the film 1. The flat electrodes 12 and 12' are provided with outlets 13 and an exhaust port 14, respectively. By moving an integral-shape planes of the film 1 crosswisely using the plate electrodes 12 and 12', the outlets 13 and the exhaust port 14 can be opened and closed. Namely, a part of the film 1 serves as a valve body for opening and closing the passage ports 13 and 14. Accordingly, gas is supplied from a gas supply tube 10 and a supply port 15 provided on the supporting structures 2 to a gas flow-in chamber sealing the plate electrodes. The outlets 13 and exhaust port 14 are fluidly connected with a gas chamber and exhaust port, respectively, so that the gas can be supplied through the outlets 13 or exhausted through exhaust port 14, respectively. In this example, the metallic film 1 is made of stainless steel having a thickness of 5 $\mu$m. The flat electrodes 12 and 12' are made of a single crystalline silicon wafer doped with impurities, and their surfaces to be brought in contact with the film 1 are insulated with thermal oxidized films having a thickness of approximately 1.5 $\mu$m, respectively.

The valve is opened and closed by applying a direct voltage of several volts across the film 1 and upper or lower electrode, and consequently the flow-out of gas is switched to the outlets 13 or the exhaust port 14.

The valve, used for flow control, naturally needs to determine its material and dimensions based on the necessary flow rate, used pressure, kinds of gases and the like. The pressure drop and conductance in the passage is due to the cross section of the ports and the amount of the gap between two operating units for operating the film. The valve of this example has a feature of suitably determining these parameters. Also, the time required for opening and closing the valve is to be within several tens milli-seconds. The material of the film 1 is preferably selected according to the kinds of the used gases. The thickness of the film 1 is preferably determined based on the magnitude of the load exerted on the film surface due to the pressure difference, and allowable deformed amount of the film surface. Also, this example involves the structural modifications such as change in number of ports and in combination thereof, and functional alternation.

Figure 6A:
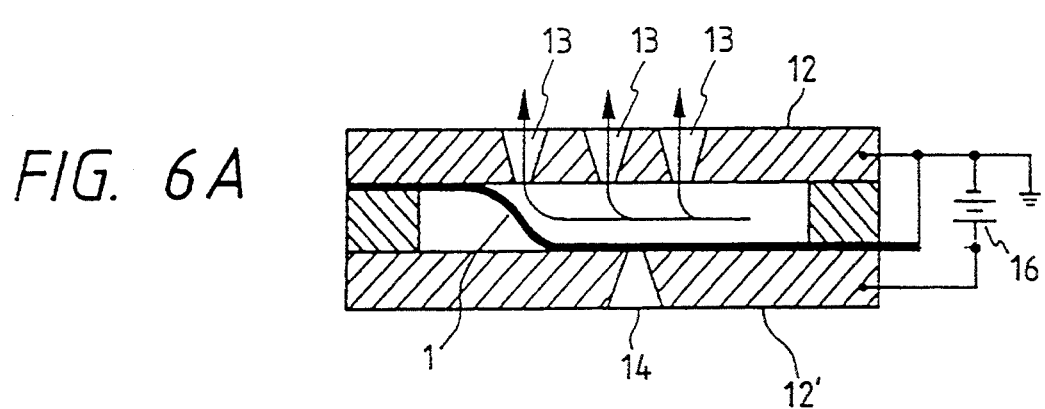
FIGS. 6A and 6B are schematic cross sectional views of the valve shown in FIG. 5 for explanating the operation thereof.
Figure 6B:
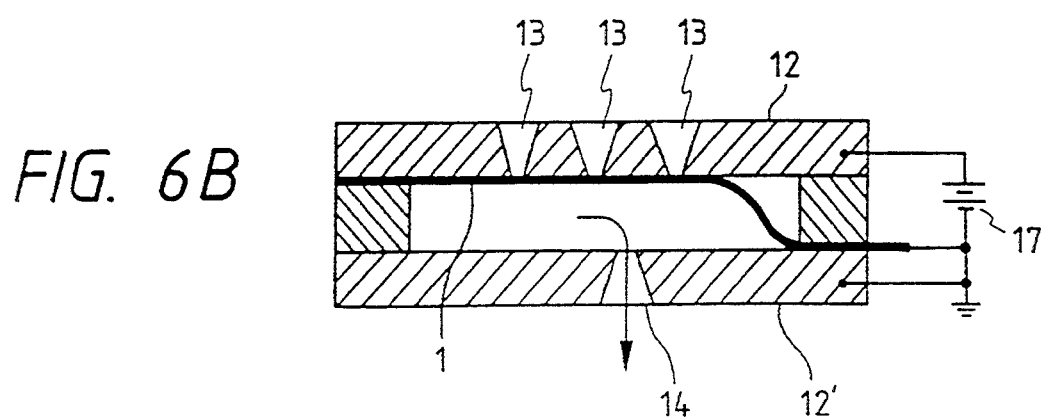

FIGS. 6A and 6B are schematic cross sectional views of the valve as shown in FIG. 5 for explanating the operation thereof. FIG. 6A shows the state where gas is made to flow-out from outlets 13 when a voltage is applied from a power supply 16 to a lower electrode 12' side. FIG. 6B shows the state where gas is made to flow-out from an exhaust port 14 when a voltage is applied from a power supply 17 to an upper electrode 12 side.

Incidentally, the evacuation of the passage on the exhaust side can be effected, as required.

The material used in the above-mentioned gas valve has the chemically stabilized surface enough to withstand the temperature of approximately 300° C. of the baking carried out for increasing the degree of vacuum in a vacuum chamber.

EXAMPLE 5

Figure 7A:
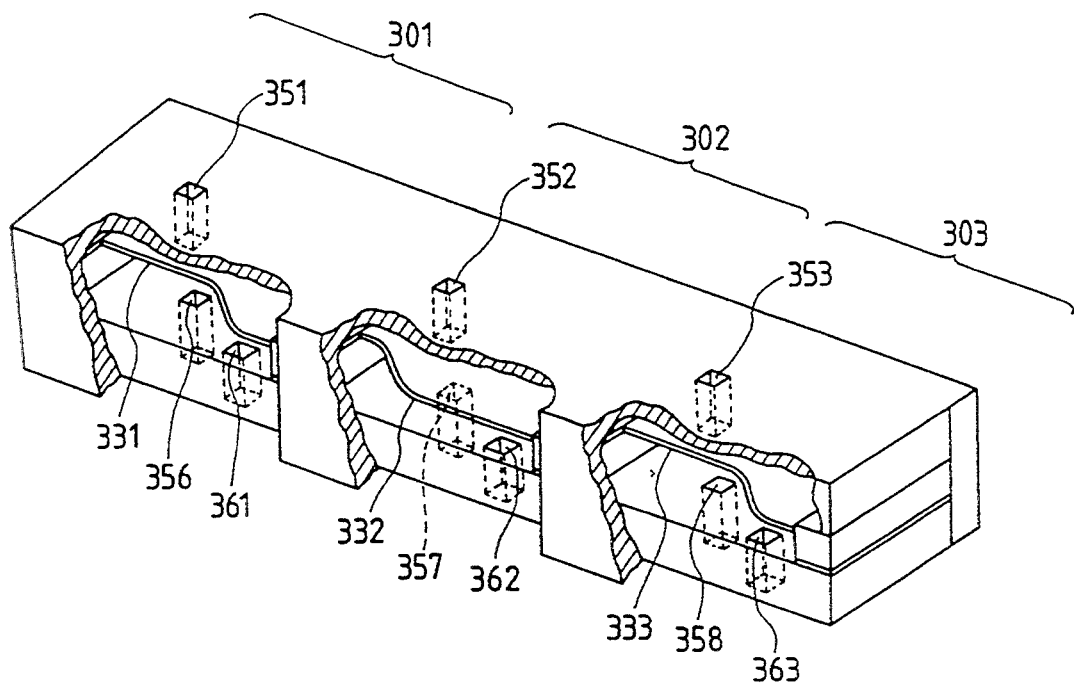
FIGS. 7A and 7B are a perspective view including a partial cross section and a cross sectional view showing an example of an integrated micro-valve according to the present invention, respectively.
Figure 7B:
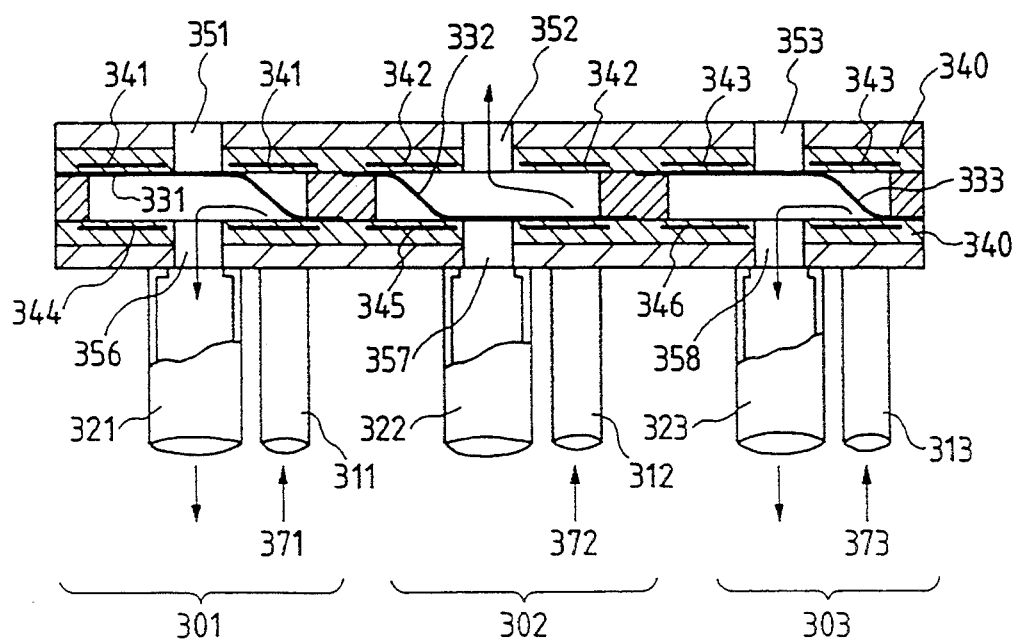

FIGS. 7A and 7B are a perspective view including a partial crosssection and a cross sectional view of an example of an integrated gas valve according to the present invention.

This embodiment is commonly provided with a plurality of valves in a matrix-like arrangement according to plural kinds of gases thereby alternately introducing gases into a semiconducting layer growth chamber. For avoiding the complexity, these figures show only the case in which three valves are integrated into a unit structure.

In the above figures, three valves 301, 302 and 303 operated according to the same principle are integrated, and are provided with gas supply pipings 311, 312 and 313, and exhaust pipings 321, 322 and 323, respectively.

The valve 301 includes a bendable metallic film 331 serving as a valve body, and a pair of plate electrodes 341 and 344 each having an insulating layer 340 on the surface. A gas outlet 351 and exhaust port 356 are provided on the parts of a pair of the electrodes 341 and 344, respectively. Gas is supplied from a gas supply port 361. In this example, the metallic film 331 is made of stainless steel having a thickness of 5 $\mu$m. The plate electrode 341 is made of a single crystalline silicon wafer doped with impurities for reducing resistivity or a metallic thin film formed on a single crystalline silicon wafer. In order to insulate the metallic film 331 from the flat electrode 341 or 344, there are formed $SiO_2$ films each having a thickness of 0.5 to 2.5 $\mu$m on the surfaces of the plate electrodes 341 and 344 being contact with the metallic film 331. In addition, a SiC plate may be used in place of the above insulating layer.

In the valve 301, by switching the voltage of 50 to 300 V applied across the film and the upper or lower electrode, the gas flow can be switched from or to the outlet 351 and to or from the exhaust port 356.

The valves 302 and 303 are made of the same material as that of the valve 301, and are provided with metallic films 331 and 333, outlets 352 and 353, and exhaust ports 357 and 358, respectively. The exhaust ports 356, 357, 358 are connected with exhaust tubes 321, 322 and 323, respectively. The supply ports 361, 362 and 363 are connected with the gas supply tubes 311, 312 and 313, respectively.

In FIG. 7B, only the gas 372 is introduced in a thin film growth chamber, and the other gases 371 and 372 are exhausted.

The valve 302 shows the case where a voltage is applied across the lower electrode 344 and the film 332 which allows gas to flow-out from the outlet 352. Meanwhile, the valve 303 shows the case where a voltage is applied across the upper electrode 343 and the film 333, which allows gas to flow-out from the exhaust port 358.

In the integrated valve, the upper electrode, lower electrode and film of each valve are insulated from each other. Also, by controlling the voltage applied to respective valves 301, 302 and 303, the gas to be introduced into the thin film growth chamber can be selected.

The integral valve of this example makes it possible to switch plural kinds of gases by the valve with a small capacity. As a result, a plurality of valves can be provided on the wall surface of the growth chamber or within the growth chamber.

In this example, different kinds of gases are introduced to the supply ports of respective valves, thus selecting the kind of gas to be supplied into the growth chamber. However, in the case of supplying the same gas to each valve, gas can be supplied from different ports.

EXAMPLE 6

Figure 8:
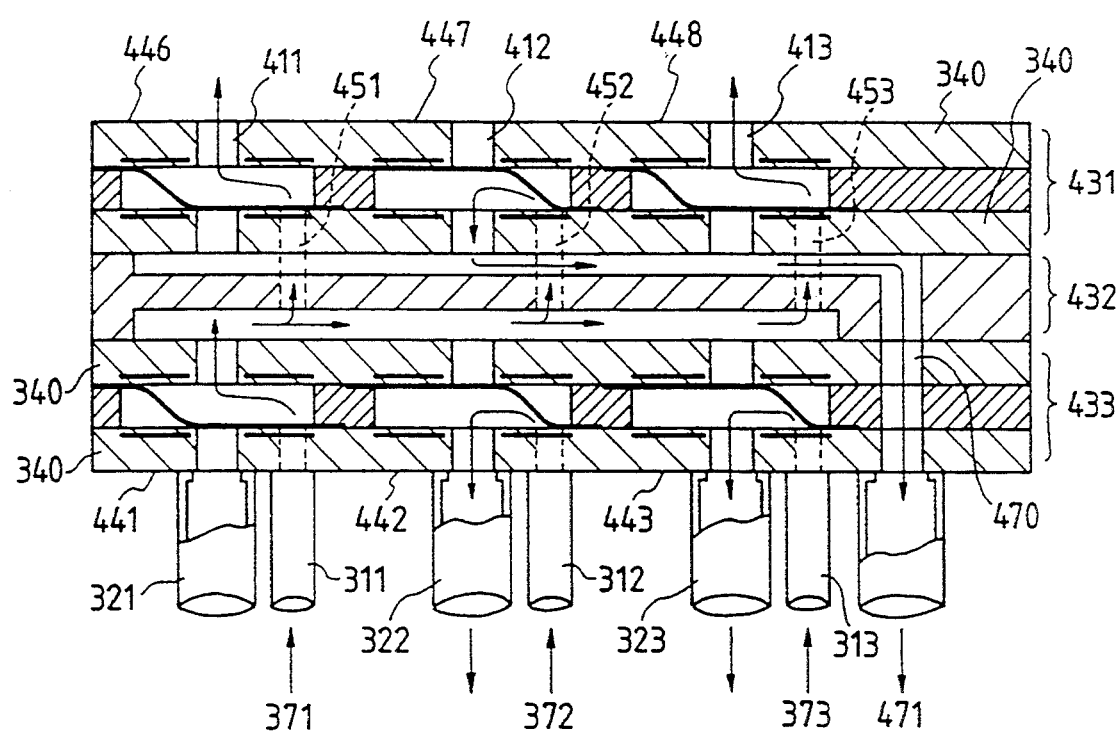
FIG. 8 is a cross sectional view of another example of a laminated type integrated micro-valve according to the present invention.

FIG. 8 is a cross sectional view of another example of a laminate type integrated gas valve according to the present invention.

This is a laminated type integrated gas valve obtained by laminating the integrated valves as shown in FIGS. 7A and 7B in a mutistage, and has such functions as of selecting the gas to be introduced into a semiconducting layer growth chamber from several kinds of gases 371, 372 and 373, and of introducing the selected gas from only the specified outlet among plural number of outlets 411, 412 and 413 to the thin film growth chamber.

The laminated integrated valve includes two integrated valves 431 and 433, and a gas channel structure 432 for connecting the integrated valves 431 and 433 to each other.

The integrated valve 433 includes three valves 441, 442 and 443. By controlling voltages applied to respective valves 441, 442 and 443, the gas to be introduced into a semiconducting layer growth chamber is selected from three kinds of gases 371, 372 and 373. In this figure, there is shown the case where only the gas 371 supplied to the valve 441 is introduced to the gas channel structure 432 and the other gases 372 and 373 are exhausted. The construction thereof is substantially similar to that of the integrated valves as shown in FIGS. 7A and 7B. Accordingly, the same parts are indicated at the same numerals and the explanation thereof is omitted.

The gas channel structure 432 includes a first gas channel for distributing the gas from a plurality of outlets of the integrated valve 433 into a plurality of supply ports 451, 452 and 453, and a second gas channel 470 for collectively exhausting (471) the gas from a plurality of exhaust ports of the integrated valve 431.

The first gas channel and the second gas channel 470 are independently formed in the gas channel structure 432.

The gas 371 selected by the integrated valve 433 is introduced to respective valves 446, 447 and 448 of the integrated valve 431 through the first channel of the gas channel structure 432 and a plurality of supply ports 451, 452 and 453 of the integrated valve 431. The gas 371 is then introduced from only the specified outlet among plural outlets 411, 412 and 413 to a semiconducting layer growth chamber. Similarly to the lower integrated valve, the upper integrated valve is constituted such that voltages applied on respective valves 446, 447 and 448 are controlled to switch the valves 446, 447 and 448. As a result, the outlets through which gas is introduced into the growth chamber can be selected. FIG. 8 shows the case where valves 446 and 448 are opened and the valve 447 is closed, which causes the selected gas 371 to be introduced into the growth chamber from the outlets 411 and 413. In the valve 447, the gas not to be introduced into the thin film growth chamber is exhausted through an exhaust channel 470 formed in the gas channel structure 432.

The laminated type integrated valve makes it possible to select the gas to be introduced into the thin film growth chamber among various kinds of gases, and to introduce the selected gas into the growth chamber from the specified outlet among a plurality of outlets, thus enabling the formation of the thin film at the specified region on the substrate.

In this example, the diameter and pitch of the outlet is specified to be 10 $\mu$m and 1 mm, respectively. In this case, by switching the gas to be introduced into the thin film growth chamber using the laminated integrated valve, approximately $10 \times 10$ $\mu m^2$ of the thin film is selectively formed on the substrate at a pitch of 1 mm. Incidentally, the average free path of the gas introduced from the outlet is sufficiently long compared with the distance between the outlet and the substrate.

In FIGS. 7A and 7B, and FIG. 8, respective valves are arranged in a single line to simplify the drawings; however, in actual, the outlets of a plurality of valves are set in a matrix-like attangement toward a plume.

EXAMPLE 7

FIGS. 9a to 9k show fabricating processes of an example of a valve fabricating method according to the present invention. Hereinafter, the fabricating processes will be described in detail.

(1) Formation of Channel on Silicon Substrate (FIGS. 9a and 9b)

A channel 120-1 having a cross width of 5 mm, length of 10 mm and depth of approximately 50 to 100 $\mu$m is formed on a silicon wafer 110-1 having a thickness of 39 $\mu$m by anisotropic etching.

The etchant used in the anisotropic etching is a 40% potassium hydroxide, and the temperature of the solution is kept at 70° C. In using a silicon wafer having a crystal face orientation of (100) on the substrate surface, the crystal face orientation of the side wall of the channel is to be (111).

(2) Formation of Electrode Pattern and Fluid Port (FIG. 9b)

A fluid port 125 and an aluminum electrode pattern 121 are formed in the channel 120-1 formed in (1) by photolithography, CVD, or sputtering. An insulating layer 122 made of a silicon oxide film or silicon nitride film is formed on the electrode pattern 121 to a thickness of several $\mu$m by sputtering or CVD.

The fluid port 125 may be formed by techniques other than etching, such as, electric discharge machining.

(3) Formation of Sacrifice Layer (FIG. 9c)

A photoresist 130-1 is spin coated on the silicon wafer 110-1 having the channel of a depth of approximately 50 to 100 $\mu$m formed with the electrode pattern and insulating layer, which are fabricated in (2). The viscosity of the photoresist and the rotational number of a spinner are determined in such a manner that the slope of the wall of the channel 120-1 is smoothly coated with the resist.

After coating on the silicon wafer, the photoresist is subjected to patterning by exposure and developing. Consequently, the photoresist 130-1 remains only on the channel 120-1 of the silicon wafer, which serves as a sacrifice layer.

(4) Formation of Film With Bend Plane (FIGS. 9d to 9e)

On the silicon wafer 110-1 subjected to photoresist pattering in (3), there is formed a metallic film 140 made of aluminum, nickel or the like to a thickness of several μm by evaporation, sputtering, CVD, or the like. The metallic thin film thus formed is subjected to patterning.

The silicon wafer 110-1 is then dipped in an etching solution to selectively etch only the photoresist 130-1 under the metallic thin film, so that the metallic film is formed into such a bridge structure as to be supported at its both ends by the silicon wafer.

(5) Assembly of Valve (FIGS. 9e to 9k)

Another silicon wafer 110-2 having a fluid port 125 and an insulating layer 122 on an electrode pattern 121 is bonded to the silicon wafer 110-1 having the metallic film in a matrix-like arrangement in the channel fabricated in (4), to thus fabricate a film electrostatic valve having a bend plane, as shown in FIGS. 9i to 9k.

The silicon wafer 110-2 is formed with a projection having a height equal to a depth of the channel 120 of the silicon wafer fabricated in (4). As an adhesive agent, there is used a polyimide resin capable of keeping its adhesiveness under high temperatures of 100° to 300° C. or lead glass capable of acting as an adhesive under comparatively low temperatures of 300° to 400° C.

FIG. 9k shows a three-way valve mechanism wherein fluid ports are provided on the upper and lower electrode plates, and gas inlets are provided on the upper and lower electrode plates or side walls of the valve, respectively.

Meanwhile, by providing two or more of fluid ports on the upper and lower electrode plates, there is obtained such a valve as being capable of discretely changing the gas flow accompanied by movement of the film. Also, by setting a plurality of the above-mentioned valves on the silicon wafer in a matrix-like arrangement, it is possible to fabricate the integrated flow control element.

EXAMPLE 8

FIGS. 10a to 10k show fabrication processes of another example of a valve fabricating method according to the present invention. The example as shown by FIGS. 9a to 9k is characterized by fabricating the film having a S-shape plane in the channel 120-1 formed on the silicon wafer 10-1 by etching, and consequently has the following disadvantages:

① The depth of the channel, which defines the stroke of the valve fabricated by bonding the silicon wafers, is limited by the thickness of the silicon wafer. As a result, it is difficult to obtain the stroke of 100 μm or more.

② In drying the substrate having the film after etching the sacrifice layer under the film, it is difficult to prevent the film from being brought in close-contact with the silicon wafer by the surface tension of the solution.

In order to solve the above disadvantages, this example as shown in FIGS. 10a to 10k uses two silicon wafers and two sacrifice layers and forms a micro-valve having the channel structure similar to the above-mentioned example as shown in FIGS. 9a to 9k.

(1) Formation of Channel on Silicon Substrate

A first thin silicon wafer 110-3 having a face orientation of (100) and a thickness of 220 μm is formed with a hole 150-1 using anisotropic etching or electric discharge machinning, as shown in FIGS. 10a and 10b.

The etchant used in the anisotropic etching is 40% potassium hydroxide, and the temperature of the solution is kept at 70° C.

A photoresist 131-1 being a first sacrifice layer is spin coated on the surface of a second silicon wafer 110-4, as shown in FIG. 10i. The silicon wafer 110-3 having the hole 150-1 is then located on the photoresist 131-1 of the second silicon wafer 110-4. Subsequently, the two silicon wafers are aligned to be then temporarily bonded, as shown in FIG. 10c. By using the thus two silicon wafers 110-3 and 110-4, there can be obtained the structure similar to the channel of the example as shown in FIGS. 9a to 9b.

In the above structure, the thickness 220 μm of the silicon wafer 110-3 is equivalent to the stroke of the valve, to thus obtain the valve with a large stroke.

(2) Formation of Sacrifice Layer

A photoresist (second sacrifice layer) is spin coated on the two silicon wafers 110-3 and 110-4 having the channel with a depth of 220 μm fabricated in (1), as shown in FIG. 10d.

The viscosity of the photoresist and rotational number of the spinner is determined so as to smoothly coat the wall slope of the channel with the resist. Subsequently, the photoresist is subjected to pattering by exposure and developing. Thus, the photoresist 130-2 (second sacrifice layer) remains only in the channel of the silicon wafer, which serves as the sacrifice layer, as shown in FIG. 10d.

(3) Formation of Film Having Bend Plane

A metallic film 140 made of aluminum, nickel or the like is formed on the two silicon wafers after photoresist patterning fabricated in (2) to a thickness of several μm by evaporation, sputtering, CVD or the like. After that, the metallic film 140 is subjected to patterning by photolithography, as shown in FIG. 10e.

The two silicon wafers 110-3 and 110-4 are dipped in an etching solution, so that only the photoresist 130-2 under the metallic film and the photoresist 131-1 between the silicon wafers 110-3 and 110-4 are selectively etched. Accordingly, the two silicon wafers are separated from each other, thus forming the metallic film having a bridge structure of being supported at only both the ends by the silicon wafer 110-3, as shown in FIG. 10f.

There may be formed such a channel (not shown) for allowing the etching solution to easily enter the silicon wafer 110-4 for uniformly and easily etching the sacrifice layer.

(4) Assembly of Valve

Two silicon wafers 110-5 and 110-6 each having a port 125 and an insulating layer 122 on an electrode pattern 121 are aligned and bonded on both sides of the silicon wafer 110-3 (having the metallic thin film formed into a bridge shape at the hole portion) fabricated in (3), to thus fabricate the valve having the film with a bend portion, as shown in FIGS. 10g, 10j, 10k and 10h. The silicon wafer 110-6 has a projection 180-2 with a height of 220 μm equal to the depth of the hole (thickness of the silicon wafer 110-3).

EXAMPLE 9

Figure 11A:
FIGS. 11a to 11k are process diagrams of a further example of a micro-valve fabricating method according to the present invention.
Figure 11I:
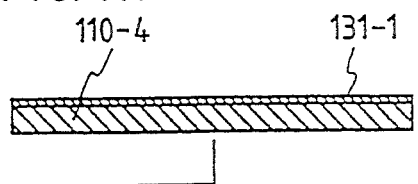
Figure 11B:
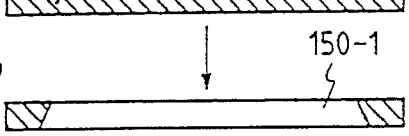
Figure 11C:
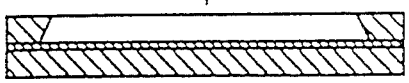
Figure 11D:
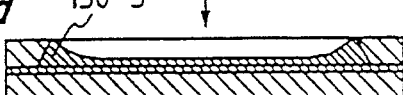
Figure 11E:
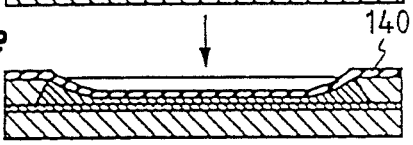
Figure 11F:
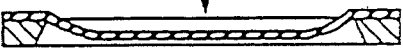
Figure 11J:
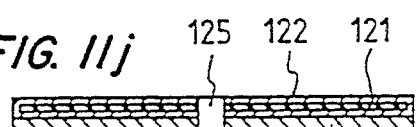
Figure 11G:
Figure 11K:
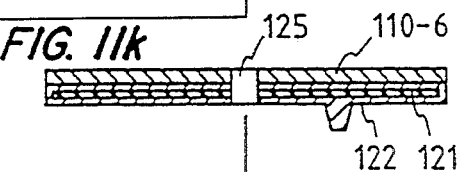
Figure 11H:
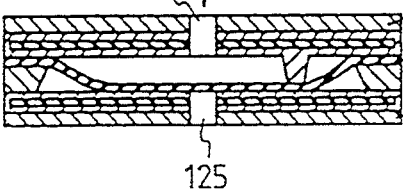
Figure 5:
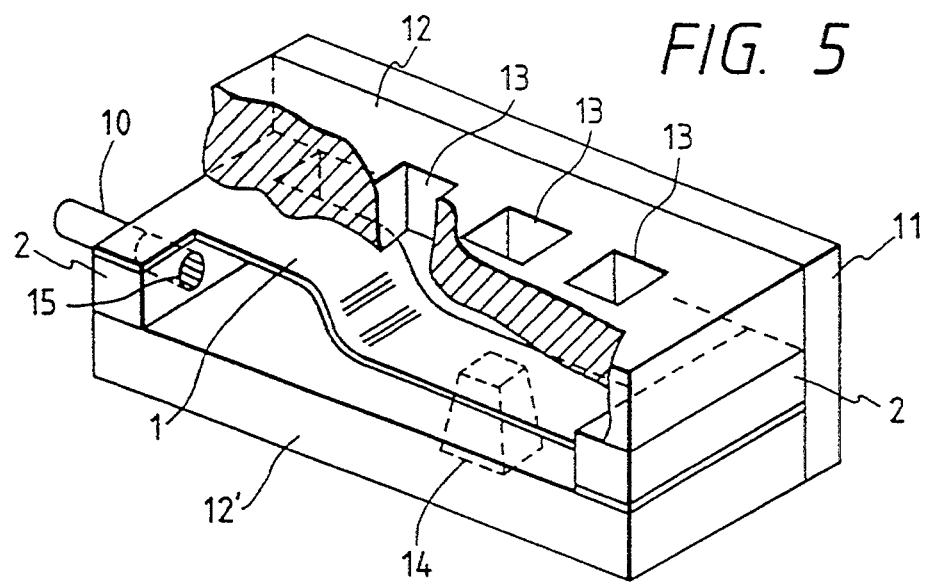
Figure 6A:
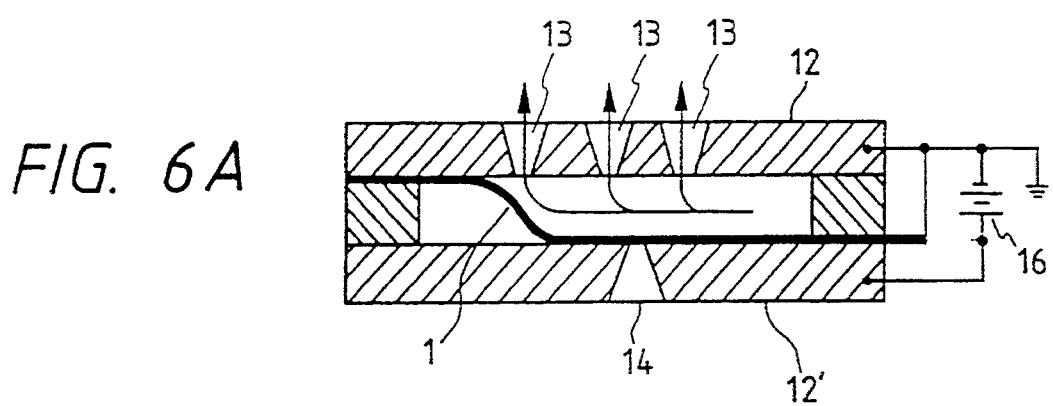
Figure 6B:
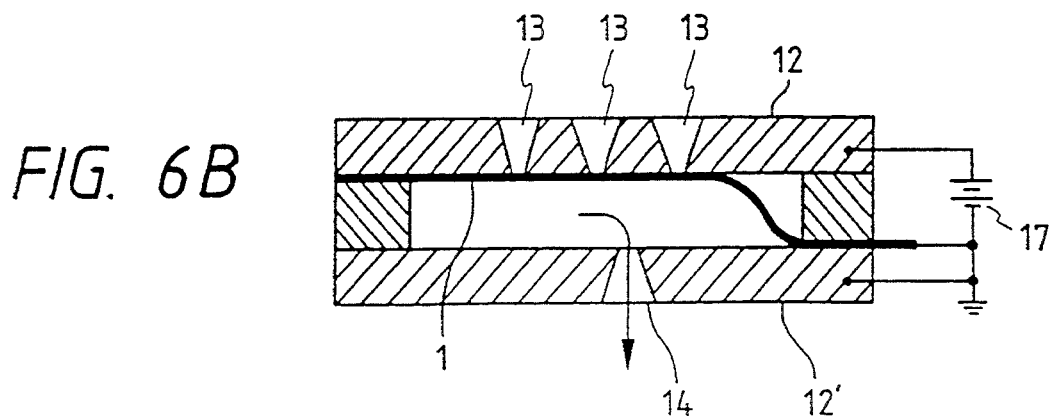

FIGS. 11*a* to 11*k* show fabrication processes of a further example of a valve fabricating method according to the present invention. A film electrostatic microvalve of this example is obtained by fabricating a S-shaped film using two silicon wafers in the same manner as shown in Example 8 expect the following point. Namely, as shown in FIG. 11*b*, when a silicon wafer 110-3 having a hole 150-1 is temporarily bonded on a silicon wafer 110-4 having a photoresist being a sacrifice layer, the bonded surface of the silicon wafer 110-3 is reversed to that shown in FIG. 10*b*. Compared with the example as shown 10*a* to 10*k*, this example involves a difficulty in forming the photoresist 130-3 in a channel after bonding the two silicon wafers, as shown in FIG. 11*d*. However, when the photoresist under the film formed in the channel is etched and thereafter such a silicon wafer as supporting only both the ends of the film is taken out of solution, this example has an effect that the film is less liable to be brought in close-contact with the slope of the hole. Thus, it is possible to easily fabricate a structure of supporting both the ends of the film by the silicon wafer, as shown in FIG. 11*f*.

EXAMPLE 10

FIGS. 12*a* to 12*k* show fabricating processes of a still further example of a valve fabrication method capable of suitably setting the valve stroke described in the Examples 8 and 9. The fabrication methods according to Examples 8 and 9 are disadvantageous in that since the valve stroke is equivalent to the thickness of the silicon wafer 110-3 having a hole 150-1, it is one-sidely determined depending on the thickness of the used silicon wafer. In the fabrication method of this example, several times of processes of patterning, etching and the like are added to the processes shown in the Examples 8 and 9, to suitably determine the stroke of the microvalve. Hereinafter, this fabrication method will be described.

(1) Formation of Channel of Silicon Substrate

Several ten μm of a step 120-2 is formed on the rear surface of a silicon wafer 110-7 having a thickness of 390 μm by anisotropic etching, as shown in FIG. 12*b*. Subsequently, a hole 150-2 is formed on a part of the step 120-2 using anisotropic etching or electric discharge machinning again, as shown in FIG. 12*b*.

The etchant used in the anisotropic etching is 40% potassium hydroxide, and the temperature of the solution is kept at 70° C. The face orientation of the silicon wafer surface is (100), and the face orientation of the slope of the hole is (111).

A photoresist 131-2 serving as a first sacrifice layer is spin coated on the surface of a silicon wafer 110-8 having a projection with a height equal to that of the step 120-2 formed on the rear surface of the silicon wafer 110-7, as shown in FIG. 12*i*. The silicon wafer 110-7 having the hole is located on the photoresist 131-2 of the silicon wafer 110-8, and the two wafers 110-7 and 110-8 are aligned and temporarily bonded, as shown in FIG. 12*c*. Thus, by using the two silicon wafers 110-7 and 110-8, there can be formed the same channel as that of Example 7 as shown in FIGS. 9*a* to 9*b*.

In this case, the valve stroke is obtained by subtracting the height of the step 120-2 formed on the rear surface from the thickness of the silicon wafer 110-7. Accordingly, by suitably controlling the etching amount for the rear surface, the valve stroke can be suitably determined.

For example, letting the height of the step be 90 μm or 140 μm, the stroke is 300 μm or 250 μm.

(2) Formation of Sacrifice Layer

A photoresist layer 130-3 (second sacrifice layer) is spin coated on the temporarily bonded two silicon wafers 110-7 and 110-8 having the channel 150-2 with, for example, a depth of 30 μm fabricated in (1), as shown in FIG. 12*d*. The viscosity of the photoresist and the rotational member of a spinner is determined so as to smoothly coat the slope surface of the channel with the photoresist.

Subsequently, the photoresist is subjected to patterning by exposure and developing. Thus, the photoresist 130-3 (second sacrifice layer) remains only in the channel of the silicon wafer, which serves as a sacrifice layer.

(3) Formation of Film With Bend Plane

A metallic thin film 140 made of aluminum, nickel or the like having a thickness of several ten μm is formed on the two silicon wafers 110-7 and 110-8 after photoresist patterning fabricated in (2) by evaporation, sputtering, CVD or the like. The metallic thin film is then subjected to patterning by photolithography, as shown in FIG. 12*e*.

The two silicon wafers 110-7 and 110-8 are dipped into etching solution so as to selectively etch only the photoresist 130-3 under the metallic thin film and the photoresist 131-2 between the silicon wafers 110-7 and 110-8. Consequently, the two silicon wafers are separated from each other, and the metallic thin film is formed into a bridge structure of being supported at both the ends by the silicon wafer 110-7, as shown in FIG. 12*f*.

Incidentally, there may be formed a channel (not shown) through which the etching solution for the sacrifice layer easily enters in the silicon wafer 110-8, so that the sacrifice layer can be uniformly etched for a shortened time.

(4) Assembly of Valve

The silicon wafer 110-7 (having the metallic thin film formed into a bridge shape at a hole portion) fabricated in (3) is bonded on both the sides with a silicon wafer 110-9 having a fluid port and an electrode pattern covered with an insulating layer on the surface of a projection 190, and a silicon wafer 110-10 having a fluid port, an electrode covered with an insulating layer, and a projection 180-4, to thus fabricate a valve having the film with a bend plane, shown in FIGS. 12*f*, 12*g*, 12*h*, 12*j* and 12*k*. In addition, the height of the projection 180-4 of the silicon wafer 110-10 is equivalent to the stroke of the valve.

EXAMPLE 11

FIGS. 13*a* to 13*m* show fabricating processes of an additional example of a valve fabricating method according to the present invention.

(1) Formation of Channel of Silicon Substrate

A channel 120-3 having a depth of a several ten μm is formed on a silicon wafer 110-11 having a thickness of 390 μm by anisotropic etching.

The etchant used in the anisotropic etching is 40% potassium hydroxide, and the temperature of the solution is kept at 70° C.

(2) Formation of Electrode Pattern and Fluid Port

A fluid port 125 and an aluminum electrode pattern 121 are formed in the channel 120-3 formed in (1) by photolithography, etching or the like. Subsequently, an insulating layer 122 made of silicon oxide film or silicon nitride film having a thickness of several μm or less by sputtering, CVD or the like, as shown in FIG. 13b.

(3) Formation of Sacrifice Layer

① An aluminum serving as a first sacrifice layer 160-1 is formed on the silicon wafer 110-11 having the electrode pattern 121 and the insulating layer 122 in the channel with the depth of several μm fabricated in (2).

② A polysilicon serving as a second sacrifice layer 161-1 is formed on the aluminum serving as the first sacrifice layer, to flatten the substrate, as shown in FIG. 13c.

③ A resist 162 is coated on the substrate, and is subjected to patterning by photolithography, as shown in FIG. 13d.

④ The second sacrifice layer 161-2 is processed by dry etching or ion milling (ion beam machinning), as shown in FIG. 13e. In this, case, the processing direction can be suitably selected by changing the ion beam at an angle to the substrate. The selection ratio of the processing speed between the second sacrifice layer 161-1 and the first sacrificer layer 160-1 is larger, and consequently the processing is stopped when the second sacrifice layer 161-1 is processed, as shown in FIG. 13e.

Subsequently, the resist on the surface of the substrate is removed. Incidentally, in the case where the resist exerts no effect on the mechanical and electrical properties of the metallic film fabricated in the later process, the resist does not needs to be removed.

(4) Formation of Film With Bend Plane

A metallic film 140 made of nickel or the like having a thickness of several μm is formed on the silicon wafer 110-11 with the sacrifice layer fabricated in (3) by evaporation, sputtering, CVD or the like.

In forming the thin film by CVD, the step of the sacrifice layer can be uniformly formed with the metallic film.

After that, the metallic film is subjected to patterning by photolithography, as shown in FIG. 13f.

(5) Assembly of Valve

The silicon wafer 110-11 (having the metallic film formed into a bridge shape in the channel) fabricated in (4) is aligned with another silicon wafer 110-12 having a fluid port and an insulating layer 122 on the electrode pattern 121, to thereby fabricate a S-shaped film electrostatic valve, as shown in FIGS. 13h to 13j.

In the above valve, upon bonding, by pushing the step of the metallic film by the projection 180-5 of the silicon wafer 110-12, hence from a bend on the metallic film using only the flat portion thereof. Accordingly, the film which is movable part of the valve fabricated in this method has a uniform internal stress, thereby causing the film to smoothly move compared with Examples 7, 8, 9 and 10.

The silicon wafer 110-12 has a projection 180-5 with a height equal to the depth of the channel 120-3 of the silicon wafer fabricated in (4).

As an adhesive agent, there is used a polyimide resin having adhesiveness to withstand high temperatures of 100° to 300° C. or a lead glass capable of showing adhesiveness under relatively low temperatures of 300° to 400° C.

In this example as shown in FIGS. 13a to 13m, the channel is formed within one silicon wafer, and a film structure serving as a valve body is formed using the channel. However, when the valve stroke is intended to be changed or the problem of the film sticking to the substrate should be solved, the fabricating methods of Example 8 to 10 are applicable.

EXAMPLE 12

FIGS. 14a to 14m show an example of combining Example 8 with Example 11 of a valve fabricating method according to the present invention. As shown in FIGS. 14a to 14m, there is provided a channel 100 for easily etching the sacrifice layer. In this figure, the same parts are indicated at the same numerals and the explanation thereof is omitted.

In the above-mentioned examples of a valve fabricating method, the photoresist is used as the sacrifice layer, and the sacrifice layer is coated in the channel of the silicon wafer, to thus obtain a film structure. As the sacrifice layer, there may be used such a material as to be selectively etched against the valve structure, other than the above mentioned photoresist, aluminum and polysilicon. The film structure can be formed by combining the channel of the silicon wafer with dry etching and ion milling (ion beam machinning).

With use of the above mentioned processes, it is possible to fabricate a fluid integrated circuit obtained by integrating valves, pumps and integrated circuits for controlling these elements within the silicon wafer.

EXAMPLE 13

Figure 15:
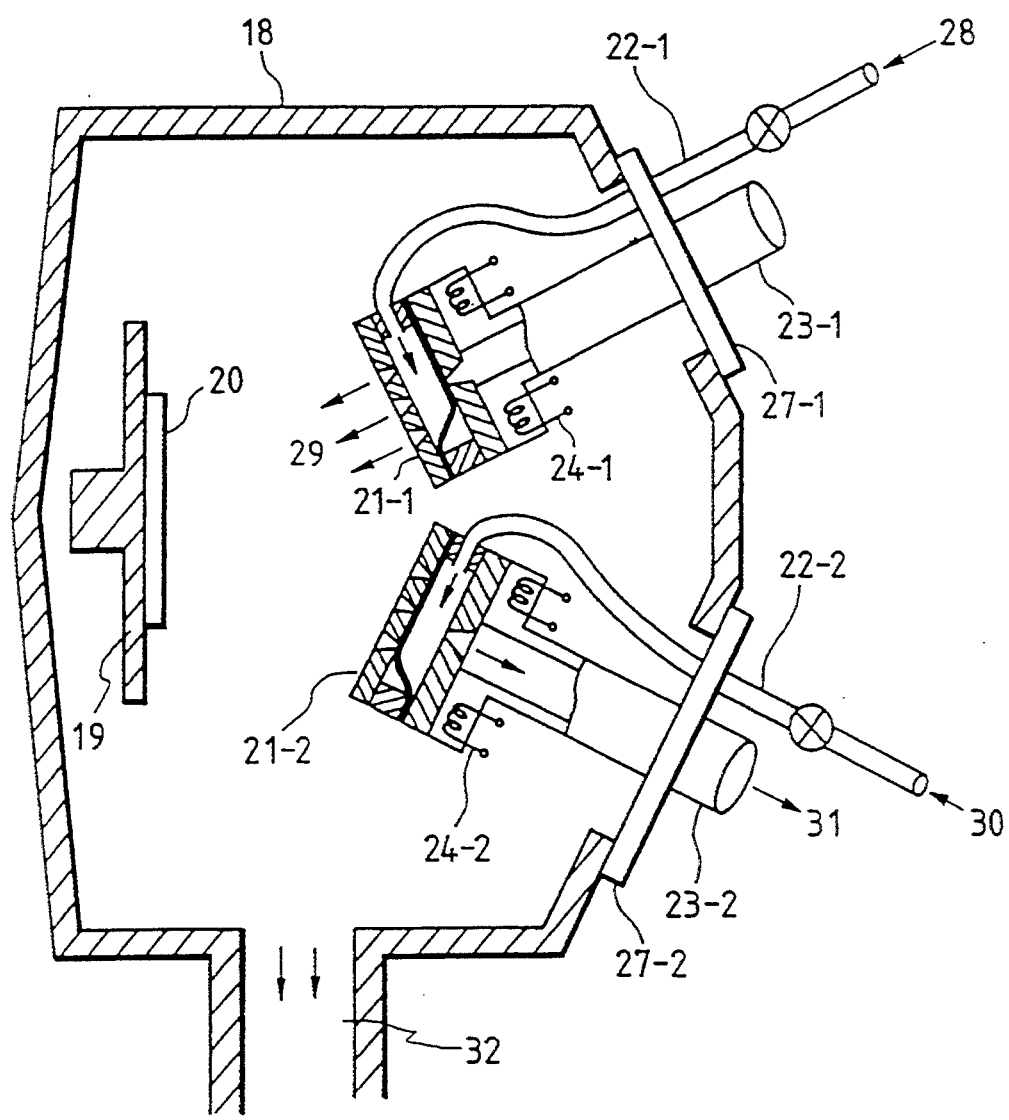
FIG. 15 is a cross sectional view showing an example of an epitaxy equipment according to the present invention.

FIG. 15 is a cross sectional view showing an example of a semiconductor fabricating equipment using the above valve according to the present invention.

In order to grow a superstructure (crystal material having a structure of being artificially controlled to laminate films each having a thickness in atomic order) on a substrate 20, there are disposed two gas valves 21-1 and 21-2 within a vacuum chamber (semiconducting thin film growth chamber). Also, the substrate 20 is mounted on a sample stage 19 within the vacuum chamber 18. In this example, a plurality of kinds of gases are alternately introduced within the vacuum chamber 18 to grow the superstructure on the substrate 20, and consequently a plurality of gas valves are disposed according to the kinds of gases. However, to avoid the complexity, this figure shows only two gas valves 21-1 and 21-2.

The gas valves 21-1 and 21-2 are externally connected with gas supply tubes 22-1 and 22-2, gas exhaust tubes 23-1 and 23-2, three lead wires (not shown) adapted to apply a voltage for opening and closing the valves, lead wires (not shown) connected with heaters 24-1 and 24-2 for heating the whole valves to prevent deposition of reaction gas, and the like, respectively. These tubes and lead wires are introduced within the vacuum chamber 18 through flanges 27-1 and 27-2 removably attached to the wall surface of the vacuum chamber 18.

The semiconductor fabricating equipment of this example is characterized by introducing a plurality of valves within the vacuum chamber. Compared with the conventional equipment where the gas valves are connected with the vacuum chamber through long pipes, this equipment is advantageous in that the release of excess gas not to contribute to epitaxial growth on the substrate 20 is reduced and the rapid switching of the gases is realized. Particularly, on supplying gas, the gas flow in the passage is kept constant, and the rapid gas switching can be achieved without yielding the turbulent flow because the outlet 13 and exhaust port 14 are controlled to be switched by the metallic film 1 within the gas valves 21-1 and 21-2. As a result, it is possible to accurately control the atomic arrangement of extremely thin layers such as a superstructure, and also to shorten the time required for growth of the film.

Figure 16A:
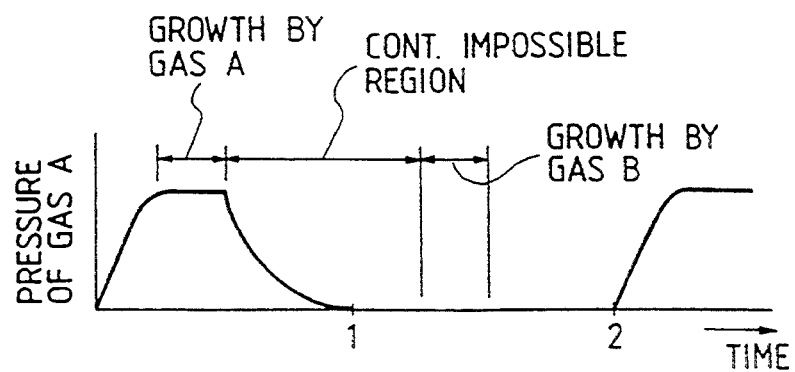
FIGS. 16A and 16B are graphs showing the relationship between gas pressure and time for explanating the operation of an conventional epitaxy equipment, respectively.
Figure 16B:
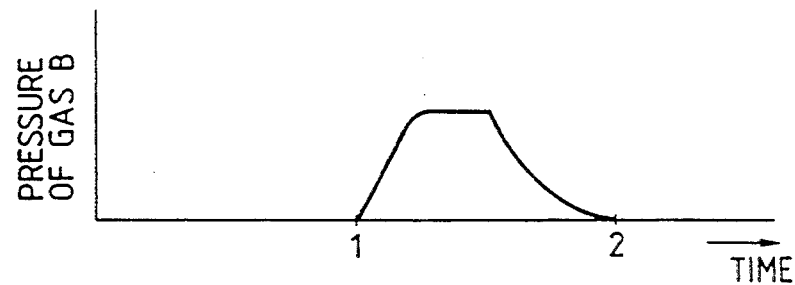
Figure 23:
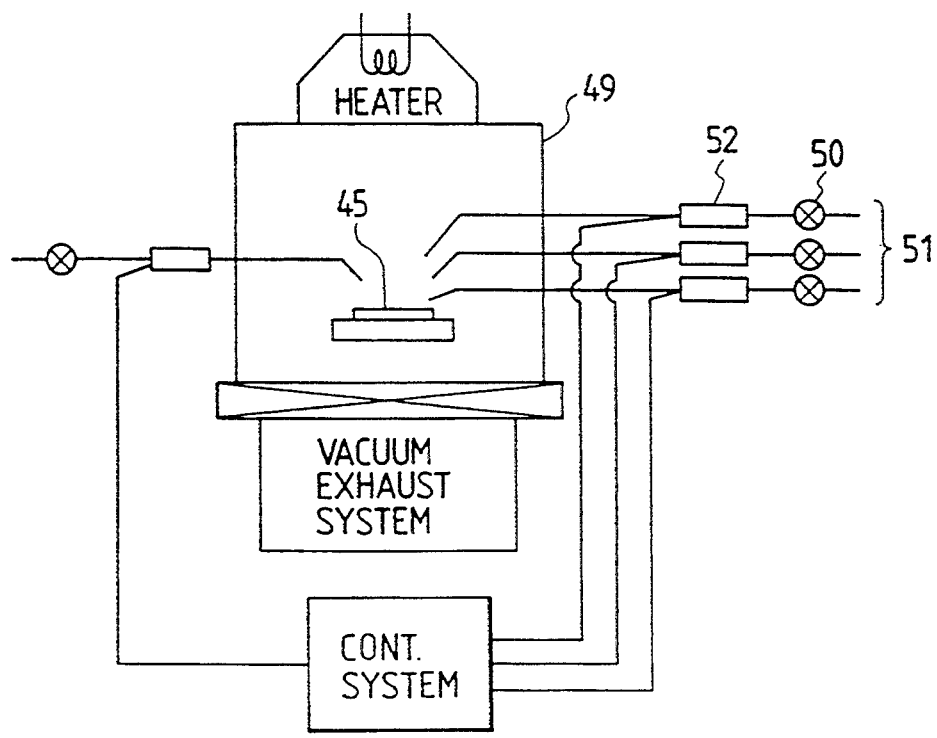
FIG. 23 is a block diagram showing a conventional epitaxy equipment.
Figure 22A:
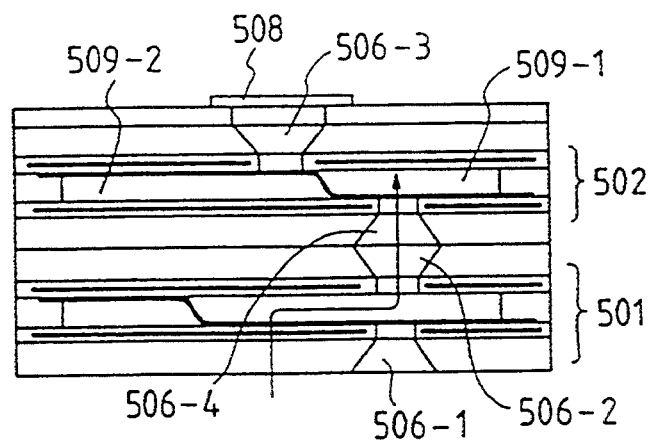
FIGS. 22a to 22d are schematic cross sectional views for explanating the operation of the micro-pump as shown in FIG. 21.
Figure 22B:
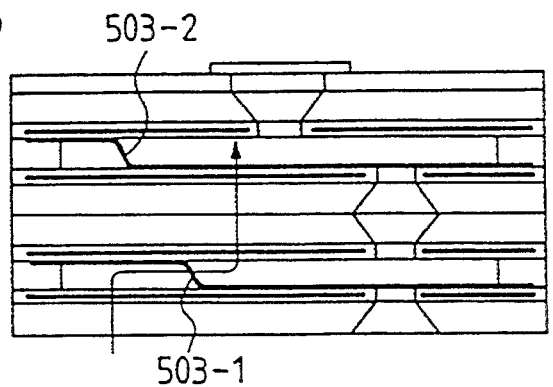
Figure 22C:
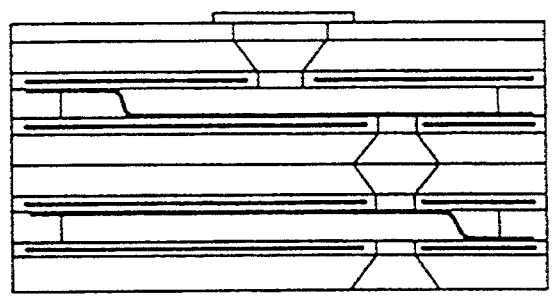
Figure 22D:
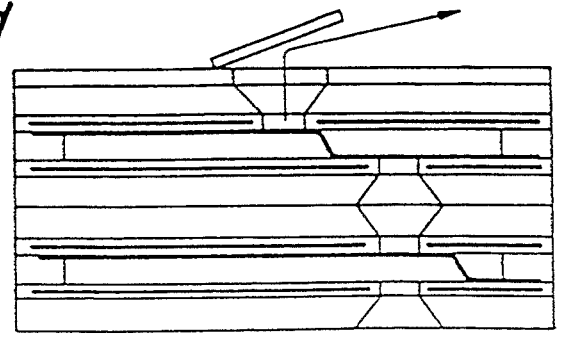

FIGS. 16A and 16B show the relationship between gas pressure and time with respect to gases A and B which is alternately supplied in the vicinity of a sample substrate controlled for epitaxial growth by the conventional equipment as shown in FIG. 23.

Figure 17A:
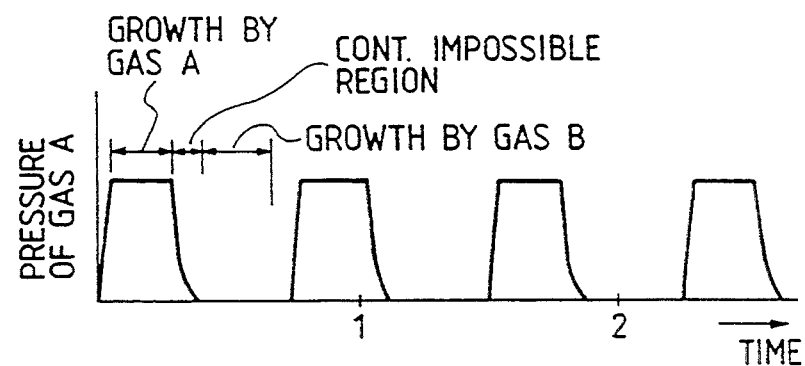
FIGS. 17A and 17B are graphs showing the relationship between gas pressure and time for explanating the operation of an epitaxy equipment according to the present invention.
Figure 17B:
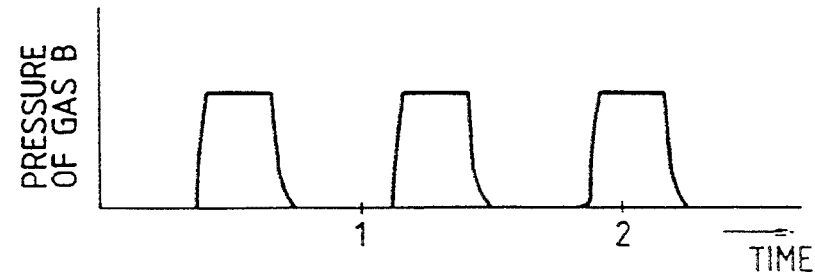

FIGS. 17A and 17B show the relationship between gas pressure and time with respect to the gases A and B in the vicinity of the substrate 20 controlled by the epitaxy equipment of this example. As will be apparent from the comparison between FIGS. 16A and 16B, and FIGS. 17A and 17B, according to this example, it is possible to shorten the time required for transient pressure change accompanied by switching the gases A and B and hence to extremely improve the controllability of gas pressure on the surface of the substrate.

In the gas valves 21-1 and 21-2 used in this example, under the principle thereof, a plurality of outlets can be arranged in one gas valve. This leads to the following two effects. An effect lies in that gas molecules can be uniformly supplied from the gas valve 21 disposed in the vicinity of the substrate 20 for epitaxial growth to the surface of the substrate. In uniformly supplying gas on the surface of the substrate by injecting gas from a single port, there is required the sufficient distance between the port and the substrate. In this case, excess gas not to contribute the growth is released within the vacuum chamber, thus lowering the controllability. In this example, the release of the excess gas not to contribute is reduced thereby realizing the rapid gas switching performance. Another effect lies in that the gas flow is changeable by one gas valve 21.

EXAMPLE 14

Figure 18:
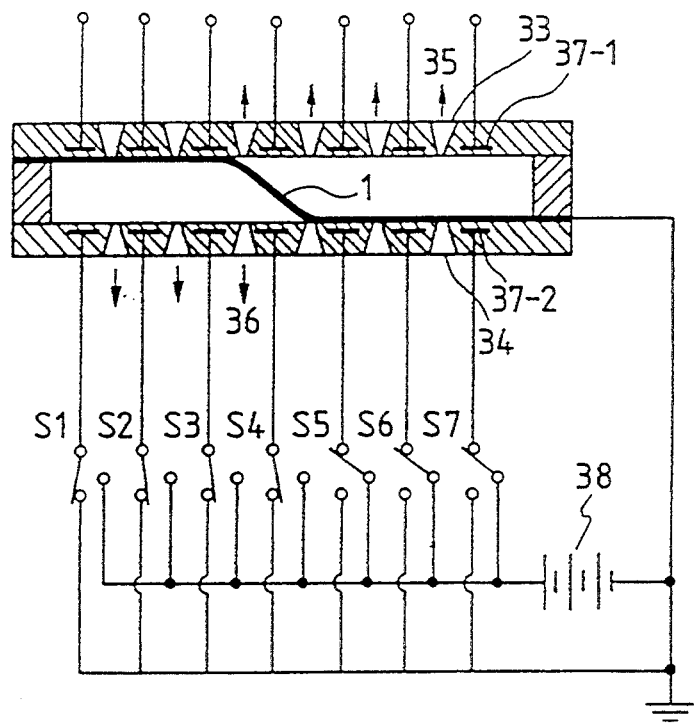
FIG. 18 is a cross sectional view showing another example of a valve according to the present invention.

FIG. 18 is a cross sectional view showing another example of a valve of the present invention. An upper plate electrode 37-1 and lower plate electrode 37-2 are divided into a plurality of electrodes, respectively, and a voltage is selectively applied from a power supply 38 to a part of, or all of the above divided electrodes, thus limiting the valve to partially or wholly opened and closed. FIG. 18 shows only the wiring form of the lower electrode 37-2 to avoid the complexity. A voltage from the power supply 38 is applied to respective divided electrodes of the lower plate electrode 37-2 through switches S1, S2, S3 . . . S7 provided according to the divided electrodes. The same wiring is effected on the upper electrode 37-1. Therefore, the electrostatic force can be exerted in the defined regions of the upper and lower electrodes, so that gas flow is changeable by selecting a port of a plurality of the outlets 33.

In this example, by sequentially opening and closing a plurality of ports, gas flow is discretely controlled. Furthermore, by setting the outlets in a matrix-like arrangement, the range of controlling the flow of the used gas can be enlarged. Incidentally, with the service condition, the shape of the curved plane in the film 1 is determined. In this case, the film 1 can be commonly applicable with respect to the mechanism, material operation, control and the like except for the difference in the shape of the curved plane.

EXAMPLE 15

Figure 19:
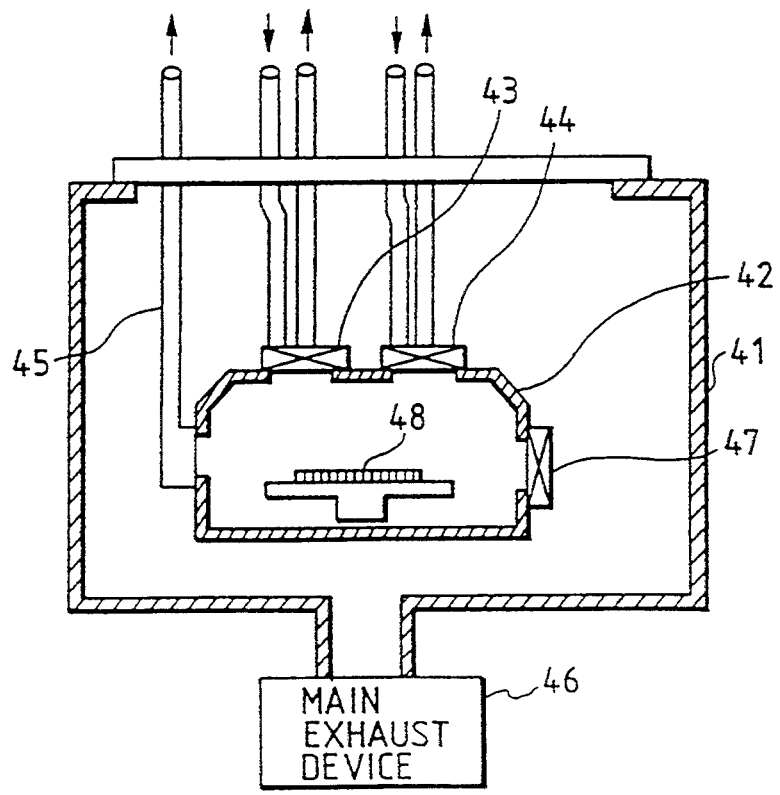
FIG. 19 is cross sectional view of another example of an epitaxy equipment according to the present invention.

FIG. 19 is a cross sectional view showing another example of a semiconductor fabricating equipment according to the present invention. In this example, for further rapidly switching different gases, a second vacuum chamber 42 is formed in a first vacuum chamber 41, and a sample substrate 48 for epitaxial growth is disposed in the vacuum chamber 42.

Valves 43 and 44 are disposed on the wall surface of the second vacuum chamber 42. Gases alternately introduced through outlets of valves 43 and 44 into chamber 42 are then directly exhausted outside the equipment from an exhaust pipe 45. Gases not introduced through outlets of valves 43 and 44 into chamber 42 are exhausted outside the equipment from exhaust pipes of valves 43 and 44 During gas is released from the valve 43, the gas pressure within the second chamber 42 is kept to be $10^{-3}$ Torr. Meanwhile, the interior of the first chamber is kept to be in an ultra-high vacuum of $10^{-9}$ Torr by a main exhauster 46. In switching the kinds of gases, a film valve 43 is closed and also a film valve 47 connecting the first and second chambers 41 and 42 with each other is fully opened, to thereby rapidly exhaust the gas within the second chamber 42. After that, by immediately closing the valve 47 and opening the valve 44, a new gas is supplied into the second chamber 42 to grow the next epitaxial layer on the substrate 48. The operation is repeated, and therefore, it is possible to rapidly supply and exhaust gas in the vicinity of the substrate.

EXAMPLE 16

Figure 20A:
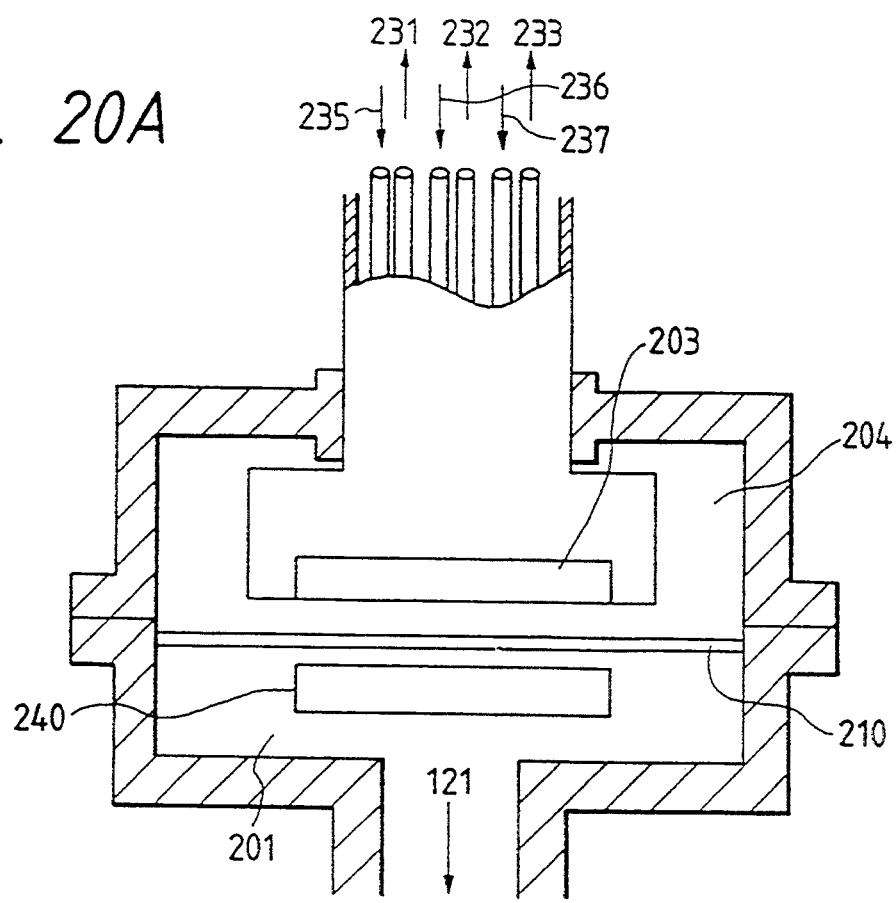
FIGS. 20A and 20B are cross sectional views showing a further example of a semiconductor fabricating equipment according to the present invention.
Figure 20B:
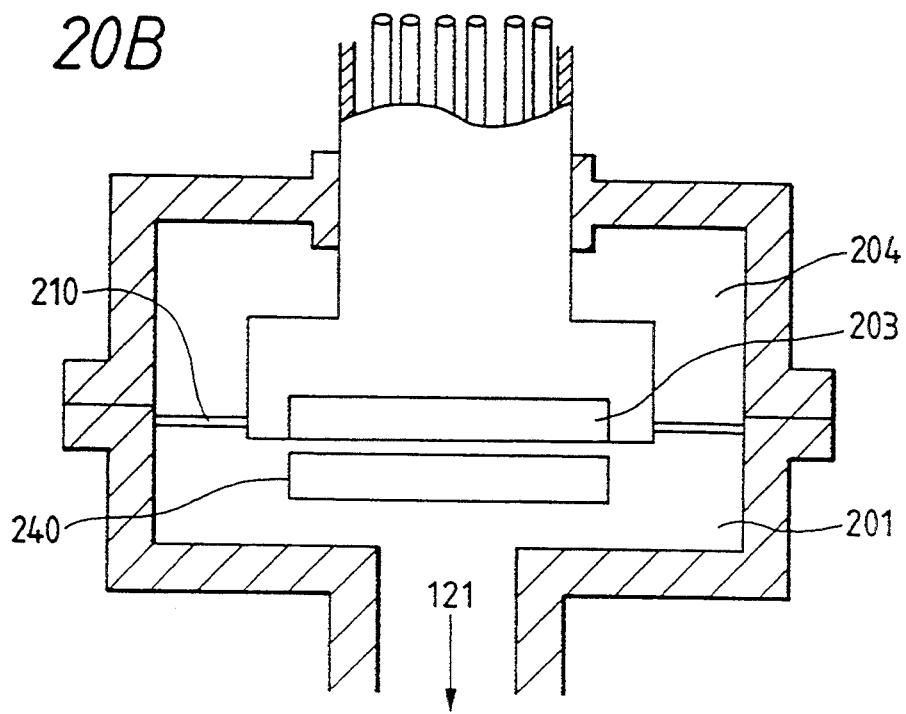

FIGS. 20A and 20B show a primary part of a further example of a semiconducting thin film fabricating equipment. The primary part of the thin film fabricating equipment includes a semiconducting layer growth chamber 201, valve mounting chamber 204, sample substrate 240 and a micro-valve 203. The thin film growth chamber 201 and the valve mounting chamber 204 are partitioned from each other by a gate valve 210.

The micro-valve 203 for switching gases to be introduced in the thin film growth chamber 201 is attached at the extreme end of a pipe within the valve mounting chamber 204, and is baked in the same degree of vacuum as in the growth chamber, as shown in FIG. 20A. Then, the gate valve 210 partitioning the growth chamber from the valve mounting chamber is opened, and the micro-valve 203 is conveyed within the thin film growth chamber 201, as shown in FIG. 20B. The thin film fabricating equipment of this example, the valve 203 is mounted or dismounted within the valve mounting chamber disposed independently from the growth chamber, so that the valve 203 can be mounted or dismounted under the condition of keeping the growth chamber at an ultra-high vacuum. In the thin film fabricating equipment of this example, the switching of gases is effected in the vicinity of the substrate 240, similarly to the above-mentioned examples. Accordingly, it is possible to extremely reduce a dead space in the piping which has been troublesome and hence to rapidly supply and exhaust the gas to be introduced in the growth chamber. This enables the accurate control of crystallinity of a semiconducting thin film. Furthermore, after exhausting the gas, the pressure in the thin film growth chamber can be returned to an ultra-high vacuum within a period of at least one second.

In the examples as shown in FIGS. 15 and 19, the valve is mounted on the wall of the growth chamber so that the mounting or dismounting needs to release the vacuum of the growth chamber once and evacuate it to an ultra-high vacuum again, and consequently the maintenance and exchange of the valve takes a period of several days. Meanwhile, this example as shown in FIGS. 20A and 20B includes the valve mounting chamber, which makes easy the mounting of the valve thereby reducing the period required for the mounting to be half a day.

In the thin film fabricating equipment of this example, the distance between the micro-valve and the substrate can be suitably determined with use of a conveyance rod for the micro-valve. This makes it possible to control the distance between the micro-valve and the substrate based on the change in kinds of gases and pressure in the growth chamber, and hence to usually form an uniform thin film on the substrate.

In any one of the epitaxy equipments of Examples 13, 15 and 16, for the specified kind of gas to be introduced in the vacuum chamber, the gas is heated from room temperature to enhance the partial pressure thereof, and is then introduced the vacuum chamber. In this case, when the part of the pipe is in low temperatures, gas is solidified to be deposited on the part, which often causes the trouble on operation of the equipment. To avoid the trouble, a heater is disposed on the part of the valves for heating the whole mechanism thereof. The heater is energized from the external power supply to be heated. This mechanism eliminates blocking of the fine hole of the nozzle and generation of deposits on the surface of the film.

In the above-mentioned example, a single crystalline silicon is used as the plate electrode; however, other material such as dielectric substance having a high dielectric constant may be used. Such material includes ceramic, such as SiC. The plate electrode made of such material needs no insulating treatment for its surface being in contact with the film. Meanwhile, current is allowed to flow between the film and the electrode thereby generating Joule's heat. With use of the Joule's heat, the whole valve structure can be heated, to thus prevent the deposition of reaction gas on the passage.

The valve urging an electrostatic or electromagnetic force is adapted to control the flow rate of fluid, particularly, a rarefied gas used under a low pressure. The reason for this is that, by only changing the height of the film supporting structures, there can be suitably set an interval of a passage put between operating units formed on upper and lower sides of the film serving as a valve body. Also, since the opening and closing of the valve is irrespective of the restoring force of the film itself, it is possible to perform high speed opening and closing action in valve due to an electrostatic force or electromagnetic force. The film-like valve body has a function of covering particles or the like in a micron order, and hence promotes the effect of sealing passage ports when dust or the like exists between the valve body and the valve seat, which makes the leakage of gas extremely small. The valve is also miniaturized, and hence includes passage ports in a matrix-like arrangement in the small area, thus being adapted to control a rarefied gas in uniform diffusion and to discretely control a flow rate thereof.

In the epitaxy equipment of the present invention wherein the above valve is provided within the vacuum chamber, there is realized the rapid switching of different gases without turbulent flow within the vacuum chamber, which makes it possible to accurately control atomic arrangement of the growing superstructure.

Furthermore, the above-mentioned equipment shortens the transient switching time in alternately introducing different gases within the vacuum chamber, to thereby shorten the time required for growth of the film.

EXAMPLE 17

Figure 21:
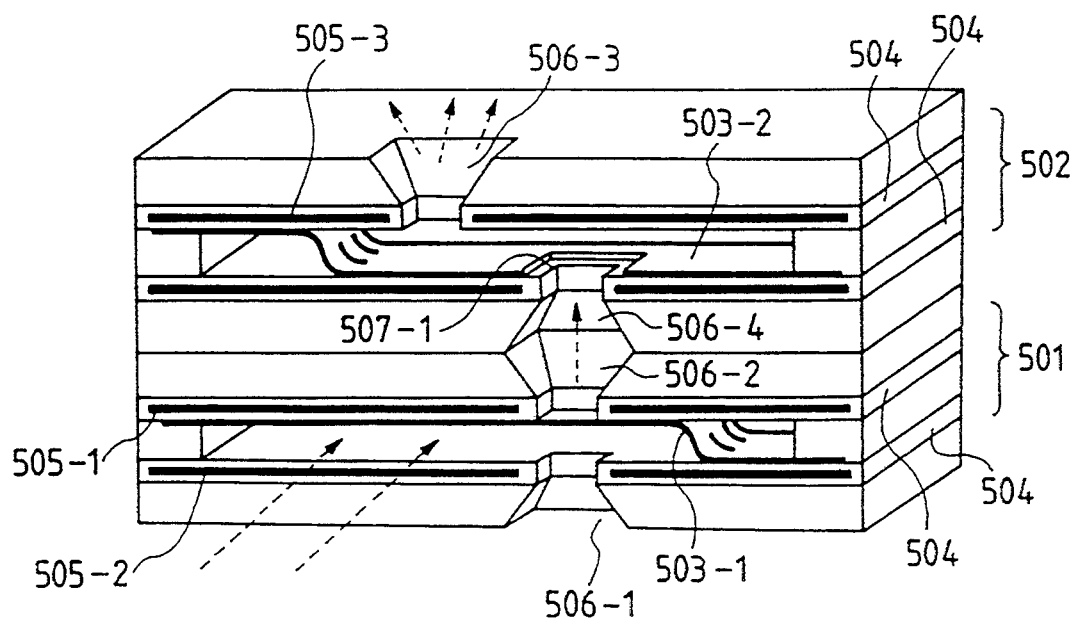
FIG. 21 is a perspective view showing an example of a micro-pump using an actuator according to the present invention.

FIGS. 21, and FIGS. 22a to 22d show an example of a micro-pump using an electrostatic actuator of the present invention. FIG. 21 is a view of a primary part of the micro-pump, and FIG. 22a to 22d are views showing the operating principle thereof.

The pump as shown in FIG. 21 has a structure obtained by laminating an electrostatic valve 501 and an electrostatic pump operating unit 502, which are operated under the same operating principle. The valve 501 and pump operating unit 502 are independently operated by electric signals.

The valve 501 is composed of a three-way valve having a piping for supporting fluid and a piping for exhausting fluid. In order to avoid the complexity, the pipings are not shown.

The valve 501 includes a bendable metallic film 503-1 serving as a valve body, a pair of plate electrodes 505-1 and 505-2 each having an insulating film 504 formed on the surface. An outlet 506-2 and exhaust port 506-1 are provided on parts of a pair of plate electrode, respectively. Fluid is supplied from a supply port (not shown) formed on the part of the plate electrode having the exhaust port 506-1. In this example, a metallic film 503-1 is composed of stainless steel having a thickness of 5 $\mu$m. The material of the plate electrode 505 is composed of a single crystalline silicon wafer having the reduced resistivity upon doting with impurities, or a metallic film formed on the single crystalline silicon wafer. A thermal oxidized film having a thickness of 0.5 to 2.5 $\mu$m is formed on the surface of the plate electrode being in contact with the metallic film 503 to insulate the metallic film from the plate electrode. Incidentally, a SiC plate may be used in place of the above electrode and the insulating film.

The valve 501 can switches the flow of fluid between the outlet side and the exhaust port side by switching the voltage of 50 to 300 V applied across the film 501 and the upper or lower electrode 505.

When the valve 501 is operated with a.c. voltage, the film 503-1 serving as a valve bodys is vertically oscillated. Accordingly, by changing the frequency of the applied voltage, the flow of fluid passing through the valve 501 is made to be continuously changed.

With use of the above valve 501, fluid is introduced within the pump operating unit 502 laminated on the valve 501. When fluid is unnecessary to be introduced within the pump operating unit 502, the fluid is exhausted by switching the valve 501.

The pump operating unit 502 laminated on the above valve 501 is operated by an electrostatic force similarly to the valve 501. The structure of the pump operating unit 502 is different from the above valve in the following points.

① Width of film 503-2

The pump operating unit is operated to exhaust fluid by moving the film 503-2. Accordingly, the film 503-2 has a width enough to be in close-contact with the side wall of the operating unit structure at the side surface thereof. In addition, the gap of 100 μm between the film and pump operating unit is remarkably smaller than the film width of 10 mm, so that the amount of fluid passing through the gap in movement of the film is substantially negligible.

② Shape of film 503-2

The pump operating unit 502 as shown in FIG. 21 is operated to introduce gas from a hole 507 formed on the portion of the film 503-2. The hole portion 507-1 of the film is fixed on the insulating layer 504 under the film, and consequently the movement of the film by the electrostatic force is effected on the left side of the hole.

The operation of the pump will be described below with reference to FIGS. 22a to 22d. These figures show a structure obtained by laminating a one-way valve 508 for preventing the counterflow of fluid and a switching valve 501 for introducing fluid to the pump operating unit on the upper and lower sides of the pump operating unit, respectively. The electrostatic valve 501 operated in the same principle as in the pump operating unit is provided on the lower side (fluid supply side to the pump) of the pump operating unit 502. Meanwhile, a one-way valve 508 is provided on the upper side (fluid exhaust side from the pump) of the pump operating unit 502. The operating procedure of the pump will be described below.

(1) Introduction of Fluid to Pump Operating Unit

By applying a voltage across the lower electrode 505-2 of the valve 501 and tile film 503-1, the S-shaped plane of the film 503-1 is moved in the left direction. Thus, the outlet 506-2 of the valve 501 is opened and the exhaust port 506-1 is closed. Accordingly, the fluid supplied to the valve 501 is introduced to a chamber 509-1 within the pump operating unit 502 through the outlet 506-2. In addition, for avoiding the complexity, the port through which fluid is supplied to the valve 501 is omitted.

The fluid is introduced through a supply port 506-4 and a hole 507 formed on the part of the film 503-2. In this case, the film 503-2 of the pump operating unit closes the outlet 506-3, as shown in FIG. 23a.

Subsequently, by applying a voltage across the lower electrode 505-4 of the pump operating unit 502 and the film 503-2, the film 503-2 is moved in the left direction, as shown in FIG. 23b.

(2) Exhaust of Fluid From Pump Operating Unit

By applying a voltage across the upper electrode 505-1 of the valve 501 and the film 503-1, the film 503-1 is moved in the right direction. Thus, the outlet 506-2 of the valve 501 is closed and the exhaust port 506-1 is opened. Accordingly, fluid supplied to the valve 501 is made to flow to the exhaust port 506-2, as shown in FIG. 23c.

Subsequently, by applying a voltage across the upper electrode 505-3 of the pump operating unit 502 and the film 503-2, the film 503-2 is moved in the left direction. Consequently, fluid filling the chamber 509-1 within the pump operating unit is exhausted through the upper one-way valve 508, as shown in FIG. 23d.

In closing the chamber 509-2 of the pump operating unit 502, the pressure of the chamber 509-2 within the pump operating unit is changed accompanied by movement of the film of the pump operating unit, so that the film is exerted with a load due to the pressure difference between the chambers 509-1 and 509-2 in addition to the electrostatic force. Accordingly, in order to move the film from end to end, the electrostatic force is required to be larger than the load due to the pressure difference.

When the pump deals with a fluid in a large amount, the change in pressure of the chamber 509-2 within the pump operating unit is made larger thus making larger the pressure difference between in the chambers 509-1 and 509-2. As a result, it is difficult to operate the valve with the electrostatic force.

In order to solve the above problem, there is provided a channel which connects the chamber 509-2 to the gas source (not shown) connected with the valve supply port 506-1, within the pump thereby preventing occurrence of the pressure difference between in the chambers 509-1 and 509-2. By providing such a channel, even in movement of the film 503-2 of the pump operating unit 502, the pressure in the chamber 509-2 within the pump is made equal to the gas pressure of the gas source (pressure of the chamber 509-1 within the pump), thus easily moving the film 503-2 by the electrostatic force.

In the structure as shown in FIG. 21, the fluid exhausted from the pump operating unit is, as required, introduced within the pump operating unit 502 by switching the valve 501 located under the pump operating unit, and is exhausted from the pump operating unit 502. Since the switching of the fluid exhausted from the pump operating unit is effected by the valve 501 laminated under the pump operating unit, the dead space is made smaller and the gas can be rapidly exhausted from the pump.

Furthermore, in integrating such structures (laminated structure of integrated pumps and integrated valves), the integrated valve are connected with the pipes for supplying various kinds of gases thereto, and are electrically operated independently from each other, thus selecting the gas to be introduced within the pump operating units. Meanwhile, the pump operating units are electrically operated independently from each other, thus exhausting the gas from the suitable position of the outlet of the pump operating units.

FIGS. 22a to 22d show the structure of laminating the electrostatic operated valve for preventing counterflow of the fluid and a one-way valve on the upper and lower sides of the pump operating unit, respectively. In this case, there can be disposed electrostatic valves operated with the same operating principle as the pump operating unit on the upper and lower sides of the pump operating unit, respectively. By further laminating the above valves and the pump operating units, fluid is sequentially supplied. By forming the above valve and pump to be several mm cube or less in size, and laminating them in multi-stages, there can be obtained a structure of supplying a small amount of fluid with electric signals.

The above valve and pump are substantially the same structure, and can be integrated on the same substrate. In this case, there can be obtained an integrated flow control system integrated with flow elements such as the valve and pump operating unit on one substrate.

I claim:

1. A semiconductor fabricating equipment wherein a wafer to grow a semiconductor thin film layer is mounted on a sample stage within a chamber and at least one kind of reaction gas is supplied in said chamber by at least one gas supplying means thereby forming a semiconducting thin film on a surface of said wafer, said gas supplying means comprising:
- a first passage for introducing gas within said chamber;
- a gas valve provided on the extreme end of said passage; and
- a second passage for introducing an unnecessary gas which does not contribute to forming the semiconducting film and which is within said gas valve to outside of said chamber, and said gas valve comprising:
- a port for releasing a necessary gas contributing to forming the semiconducting film among the gases supplied through said first passage to said wafer;
- a port for releasing the unnecessary gas to said second passage; and
- gas amount controlling means for controlling a ratio of said necessary gas to said unnecessary gas.

2. A semiconductor fabricating equipment according to claim 1, wherein said gas valve comprises:
- a vessel filled with gas;
- a film having at-least one inflexion plane movable within said vessel;
- a plurality of ports provided on a wall of said vessel; and
- film operating means for opening and closing the plurality of ports by movement of said inflexion plane of said film.

3. A semiconductor fabricating equipment according to claim 2, wherein said gas valve further includes means for controlling the temperature of said gas valve.

4. A semiconductor fabricating equipment according to claim 2, wherein at least a part of said film is conductive, and said film operating means includes at least one electrode provided on the wall of the vessel facing upper and lower sides of said film, means for applying a voltage across said electrode and said film, and a control circuit for controlling said voltage.

5. A semiconductor fabricating equipment according to claim 2, said film is made of a magnetic material, and said film operating means comprises magnetic force generating means provided on the wall of the vessel facing the upper and lower sides of said magnetic film.

6. A semiconductor fabricating equipment according to claim 2, wherein said gas valve is disposed in such a manner that the plurality of ports thereof face to said wafer.

7. A semiconductor fabricating equipment according to claim 2, wherein said gas valve is mounted on a wall surface of a semiconducting thin film growth chamber within said chamber.

8. A semiconductor fabricating equipment wherein a second chamber is disposed in a first chamber, a wafer to grow a semiconductor thin film layer is mounted on a sample stage within said second chamber, and reaction gas is supplied within said second chamber by at least one gas supplying means, to thereby form a semiconducting thin film on the surface of said wafer, said gas supplying means comprising:
- a first passage for introducing gas within said chamber;
- a gas valve provided on the extreme end of said passage; and
- a second passage for introducing an unnecessary gas which does not contribute to forming the semiconducting film and which is within said gas valve to outside of said chamber, and said gas valve comprising:
- a port for releasing a necessary gas which contributes to forming the semiconducting film among the gases supplied through said first passage to said wafer;
- a port for releasing the unnecessary gas to said second passage; and
- gas amount controlling means for controlling a ratio of said necessary gas to said unnecessary gas, and said second chamber further comprising:
- a valve for controlling the communication of gas between said first chamber and second chamber; and
- a pipe for introducing gas within said second chamber to outside of said first chamber.

9. A semiconductor fabricating equipment according to claim 8, wherein said valve comprises:
- a vessel filled with gas;
- a film having at least one inflexion plane movable within said vessel;
- a plurality of ports provided on a wall of said vessel; and
- film operating means for opening and closing the plurality of ports by movement of said inflexion plane of said film.

10. A semiconductor fabricating equipment comprising:
- a semiconducting thin film growth chamber; and
- an integrated valve having a plurality of valves integrated on a unit structure, wherein each of said valves comprises:
    - gas supply;
    - gas exhaust ports;
    - gas outlet ports;
    - a bendable film;
    - electrodes covered with insulating layer for operating said film by an electrostatic force;
    - a piping for supplying gas to said gas supply ports;
    - a piping for exhausting gas from said gas exhaust ports; and
    - operating means for applying a voltage to said electrodes of each of said valves thereby operating said film.

11. A semiconductor fabricating equipment according to claim 10, wherein respective gas outlets of said plurality of valves are arranged two-dimensionally.

12. A semiconductor fabricating equipment according to claim 10, wherein said semiconducting thin film growth chamber is capable of being independently vacuum-evacuated and comprises:
- a first chamber for mounting said valve;
- a second chamber which is a sample chamber for internally mounting a sample substrate to grow a semiconducting thin film; and
- a means for moving a plurality of outlets of said integrated valve to said second chamber in carrying out the semiconducting thin film growth, which is provided between said first and second chambers.

13. A process for fabricating a micro-valve including a plurality of ports on a wall of a vessel, and a film having an inflexion plane movable within said vessel, electrodes covered with insulating layer in the wall of said vessel for opening and closing the plurality of ports by movement of said inflexion plane of said film, comprising:
- a. a first step of preparing a first substrate including a channel having at least one port and an electrode on the bottom thereof;
- b. a second step of forming a soluble sacrifice layer on the bottom portion of said channel;
- c. a third step of laminating a conductive material on said sacrifice layer, and then removing said sacrifice layer, thereby forming such a conductive film member that both ends thereof is supported by the first substrate near said channel and a supporting portion thereof is separated from the bottom portion of said channel; and
- d. a fourth step of aligning and bonding a second substrate having an insulating layer, an electrode and port to said first substrate on a side thereof opposed to the bottom portion of said channel with respect to said film member, to thereby form a vessel.

14. A process for fabricating a micro-valve according to claim 13, wherein said second step including the steps of:

forming a first soluble sacrifice layer in the bottom of said channel and a second sacrifice layer on said first sacrifice layer;

coating a resist on said second sacrifice layer and carrying out patterning of said resist; and processing the shape of said second sacrifice layer using the patterned resist and removing the resist.

15. A process for fabricating a micro-valve according to claim 13, wherein said first and second substrates are made of silicon.

16. A process for fabricating a micro-valve including a plurality of ports on a wall surface of a vessel, and a film having at least one inflexion plane within said vessel, and electrodes covered with an insulating layer for opening and closing a plurality of ports by movement of said inflexion plane of said film, comprising:

- a. a first step of forming a hole serving as the interior of said vessel on a first substrate;
- b. a second step of forming a first sacrifice layer on a second substrate, and aligning said first substrate on said first sacrifice layer;
- c. a third step of forming a second sacrifice layer on the bottom of a hole portion where said first sacrifice layer obtained in said second step is bottomed;
- d. a fourth step of laminating a conductive material on said second sacrifice layer, then removing said first and second sacrifice layers and also said second substrate, thereby forming such a conductive film that both ends of said conductive material is supported by the substrate near the side walls of said hole;
- e. a fifth step of preparing said third and fourth substrates each having an electrode and at least one port; and
- f. a sixth step of rigidly fixing said third and fourth substrates on both sides of said conductive film, respectively.

17. A process for fabricating a micro-valve according to claim 16, wherein said first step includes the step of sleppedly forming said hole of said first substrate such that lower portion of said hole is larger than an upper portion of said hole; and said second step including the step of forming a projection on a surface of said second substrate, said projection being wider than the upper portion of said hole and narrower than the lower portion of said hole.

18. A process for fabricating a micro-valve according to claim 16, wherein said second step includes the step of forming a plurality of channels for passing etching solution for the sacrifice layer therethrough on said second substrate in the thickness direction.

19. A process for fabricating a micro-valve according to claim 16, wherein said first, third and fourth substrates are made of silicon.

* * * * *